(12) United States Patent
Mitsutake et al.

(10) Patent No.: US 6,788,985 B2
(45) Date of Patent: Sep. 7, 2004

(54) ELECTRONIC COMMERCE METHOD FOR SEMICONDUCTOR PRODUCTS, ELECTRONIC COMMERCE THEREOF, PRODUCTION SYSTEM, PRODUCTION METHOD, PRODUCTION EQUIPMENT DESIGN SYSTEM, PRODUCTION EQUIPMENT DESIGN METHOD, AND PRODUCTION EQUIPMENT MANUFACTURING METHOD

(75) Inventors: Kunihiro Mitsutake, Yokohama (JP); Katsuya Okumura, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 434 days.

(21) Appl. No.: 09/867,465

(22) Filed: May 31, 2001

(65) Prior Publication Data

US 2001/0051886 A1 Dec. 13, 2001

(30) Foreign Application Priority Data

May 31, 2000 (JP) .................................... 2000-163042
May 31, 2000 (JP) .................................... 2000-163043

(51) Int. Cl.[7] ............................................ G06F 19/00
(52) U.S. Cl. .......................... 700/97; 700/95; 700/291; 703/22
(58) Field of Search .......................... 700/95–98, 108, 700/291; 705/29; 703/2, 22

(56) References Cited

U.S. PATENT DOCUMENTS

| | | | | |
|---|---|---|---|---|
| 4,141,069 A | * | 2/1979 | Fox ............................. | 700/291 |
| 4,725,970 A | * | 2/1988 | Burrows et al. .............. | 703/14 |
| 5,307,260 A | | 4/1994 | Watanabe et al. | |
| 5,357,439 A | | 10/1994 | Matsuzaki et al. | |
| 5,493,501 A | | 2/1996 | Kondo | |
| 5,691,906 A | | 11/1997 | Togashi et al. | |
| 5,694,325 A | | 12/1997 | Fukuda et al. | |
| 5,850,345 A | * | 12/1998 | Son ............................. | 703/17 |
| 5,873,251 A | * | 2/1999 | Iino ............................ | 60/660 |
| 5,974,246 A | * | 10/1999 | Nakazawa ..................... | 703/2 |
| 6,021,359 A | * | 2/2000 | Sakakibara et al. ......... | 700/108 |
| 6,434,440 B1 | * | 8/2002 | Teranishi et al. ............. | 700/97 |
| 6,470,227 B1 | * | 10/2002 | Rangachari et al. .......... | 700/95 |

FOREIGN PATENT DOCUMENTS

| | | |
|---|---|---|
| EP | 0 319 442 | 6/1989 |
| EP | 0 425 405 | 5/1991 |
| EP | 0 463 616 | 1/1992 |
| JP | 7-153815 | 6/1995 |
| JP | 8-147368 | 6/1996 |
| JP | 1133766 | 10/1996 |
| JP | 10-207506 | 8/1998 |
| KR | 2000-24593 | 5/2000 |
| WO | WO 99/46646 | 9/1999 |

* cited by examiner

Primary Examiner—Albert W. Paladini
Assistant Examiner—Alexander Kosowski
(74) Attorney, Agent, or Firm—Oblon, Spivak, McClelland, Maier & Neustadt, P.C.

(57) ABSTRACT

An electronic commerce for semiconductor products comprises a network, a client terminal, a connection server, a virtual production line, and a real production line. The real production line actually manufactures semiconductor products. The virtual production line provides a computer with substantially the same functions as the real production line and computes an optimal lot progress. The connection server connects the virtual production line to the client terminal via the network. When a condition is entered from the client terminal, the connection server transfers this condition to the virtual production line. Simulation is performed realtime for determining whether a product flows in the virtual production line under the transferred condition. The connection server transfers a simulation result to the client terminal. Based on the simulation result, a electronic commerce is conducted.

4 Claims, 20 Drawing Sheets

Select the type of order placement.

(1) Specify device functions (2) Specify device parts

FIG. 5

Estimated prices and delivery times are:

| Quantity ordered | Unit price ($) | Delivery time (days) |
|---|---|---|
| 100 | 20 | 5 |
| 500 | 20 | 5 |
| 1000 | 18 | 7 |
| 2000 | 16 | 10 |
| 5000 | 15 | 15 |
| 10000 | 14 | 15 |
| 20000 | 12 | 15 |

[ Next ]  [ Cancel ]

FIG. 7

Enter functions needed for the system.

(1)

(2)

(3)

(4)

[Next]

[Cancel]

FIG. 6A

Select necessary parts.

(1) Logic     Number of elements ( )
                Clock speed ( ) MHz (2) Memory    Memory type ( )
                Integration ( ) Mbit
                Operation mode ( )

(3) DSP        ( )

(4) Others     ( )

[Next]

[Cancel]

FIG. 6B

Enter the quantity and the delivery time you want.

quantity:(   ) items

Delivery:Month(   )Day(   )

[ Next ]   [ Cancel ]

FIG. 8

The delivery time and the price are estimated as follows. When you place an order, click the Order button. When you continue the negotiation, click the Negotiate button.

Delivery:Month(   )Day(   )or proximity

Price:($ /item)

[ Order ]   [ Negotiate ]   [ Cancel ]

FIG. 9

```
Re-enter the quantity and the delivery
time you want.

Desired delivery:Month(   )Day(   )

Desired price:($  /item)
```

[Next]    [Cancel]

Product A's recipe information
(Example)

| Process No. | Process name | Apparatus | Processing time |
|---|---|---|---|
| 1 | Cleaning | Cleaning1 | 20 |
| 2 | Oxidation | Diff1 | 90 |
| 3 | Film thickness measurement | QC1 | 10 |
| ... | | | ... |

FIG. 13A

Apparatus information
(Example)

| Apparatus No. | Apparatus name | Number of apparatuses | Apparatus neme | Number of concurrently processible lots | Apparatus state |
|---|---|---|---|---|---|
| 1 | Cleaning1 | 1 | Cleaning1 | 1 | Operating(to be maintained after 30 hours and 20 minutes) |
| 2 | Diff1 | 2 | Diff1#1 | 2 | Operating(to be maintained after 50 hours and 10 minutes) |
| | | | Diff1#2 | 2 | Maintenance in process(to be operated after 4 hours and 10 minutes) |
| 3 | QC1 | 1 | QC1 | 1 | Operating(to be maintained after 20 hours) |
| ... | | | ... | | ... |

FIG. 13B

Lot progress situation
(Example)
Data and time:Year Month Day Hour Minute

| Lot No. | Product | State |
|---|---|---|
| Lot110 | Product A | Processing at Diff1(30 minutes after startup) |
| Lot111 | Product B | Waiting at Cleaning1 for 30 minutes |
| ... | ... | ... |

FIG. 13C

Determination condition for optimal flow
(Example)

| Priority | Content |
|---|---|
| (1) | Output amount:Maximum |
| (2) | Average work period:Minimum |
| (3) | ... |

FIG. 13D

Monthly lot progress estimate
(Example)

| Lot No. | Process number | Apparatus | Lot transport time | Wait time | Start time | End time |
|---|---|---|---|---|---|---|
| Lot110 | Process10 | Equipment5#1 | 5Min | 10Min | Apr.10 13:10 | Apr.10 13:40 |
| | Process11 | Equipment7#2 | 10Min | 0Min | Apr.10 13:50 | Apr.10 14:10 |
| | Process12 | Equipment1#1 | ... | ... | ... | ... |
| | ... | ... | ... | ... | ... | ... |
| | Process300(last process) | | | | | Apr.20 10:10 |
| Lot110 | Process20 | Equipment2#1 | 15Min | 0Min | Apr.10 13:20 | Apr.10 13:40 |
| | Process21 | Equipment1#2 | 10Min | 20Min | Apr.10 14:10 | Apr.10 14:20 |
| | Process22 | Equipment3#1 | ... | ... | ... | ... |
| | ... | ... | ... | ... | ... | ... |
| | Process350(last process) | | | | | Apr.22 10:10 |

FIG. 13E

```
<Example of electric power or power usage conditions>

Maximum power(total):500kW
Maximum power(Group1):150kW(Group1:Lithography)
Maximum power(Group2):100kW(Group2:Diffusion furnace,
RTA, LPCVD)
...

Maximum deionized water usage(total):50 liter/min
Maximum deionized water usage(Group3):10 liter/min
 (Group3:CMP)
Maximum deionized water usage(Group4):15 liter/min
 (Group4:Wet process)
...
```

Product name: Product A
Process name: Diffusion process
Process number: 30
Apparatus: Diff1
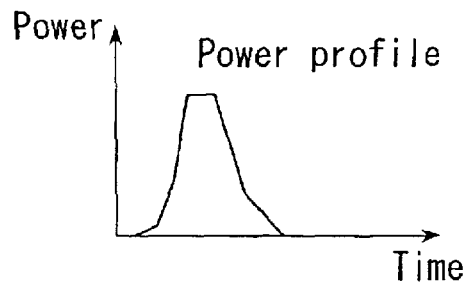
Product name: Product A
Process name: RTA process
Process number: 50
Apparatus: RTA1
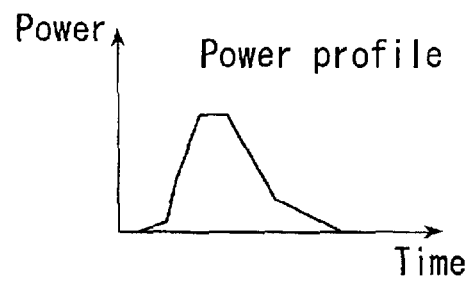
...
Product name: Product A
Process name: Pre-treatment process
Process number: 40
Apparatus: Cleaning1
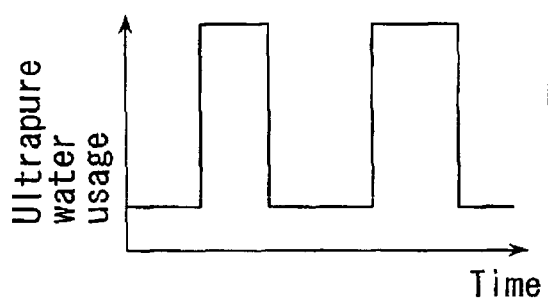
...
FIG. 19

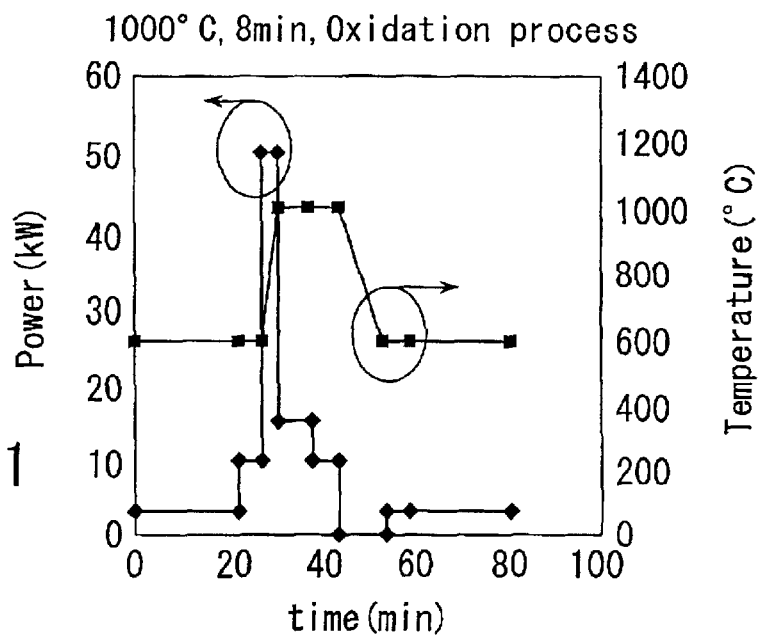
FIG. 21
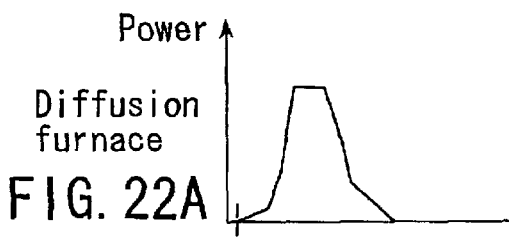
FIG. 22A
FIG. 22B
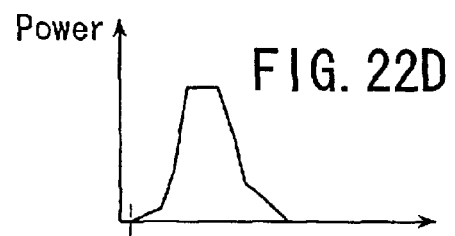
FIG. 22D
FIG. 22E
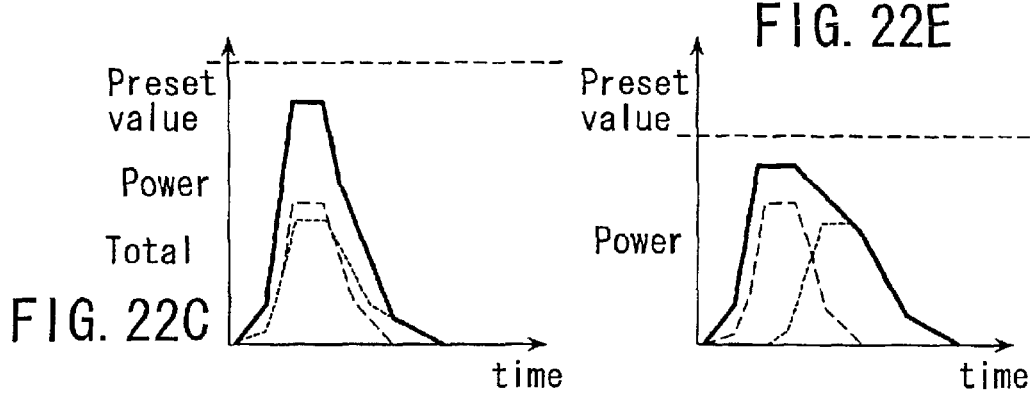
FIG. 22C
FIG. 22F

ELECTRONIC COMMERCE METHOD FOR SEMICONDUCTOR PRODUCTS, ELECTRONIC COMMERCE THEREOF, PRODUCTION SYSTEM, PRODUCTION METHOD, PRODUCTION EQUIPMENT DESIGN SYSTEM, PRODUCTION EQUIPMENT DESIGN METHOD, AND PRODUCTION EQUIPMENT MANUFACTURING METHOD

CROSS-REFERENCE TO RELATED APPLICATIONS

This application is based upon and claims the benefit of priority from the prior Japanese Patent Applications No. 2000-163042, filed May 31, 2000; and No. 2000-163043, filed May 31, 2000, the entire contents of both of which are incorporated herein by reference.

BACKGROUND OF THE INVENTION

1. Field of the Invention

The present invention relates to an electronic commerce method and system for semiconductor products in case of conducting electronic commerce for semiconductor products via a network and a production system, a production method, a production equipment design system, a production equipment design method, and a production equipment manufacturing method for effective operations in a factory.

2. Description of the Related Art

Conventionally, a typical semiconductor factory monthly produces general-purpose products such as memory chips on the basis of several thousand lots. A production line includes too may lots and requires a long period of production. Because of this, it has been difficult to estimate the completion of the product after it went into production. Even in this situation, general-purpose products need not be especially considered regarding input of a lot in accordance with the delivery time, causing no serious problems. Generally, one lot can take in about 25 to 50 wafers. Of course, the lot can take in about 1 to 50 or 100 wafers.

On the other hand, a semiconductor factory in a SOC (System On Chip) age is considered to chiefly produce system LSI chips on a scale of several hundred lots as a monthly production in accordance with customer requests. Such a small-scale factor (hereafter referred to as the mini-fab) needs to input a necessary amount of lots and follow the delivery time by conducting a proper lot progress management. Further, it is necessary to determine whether it is possible to actually manufacture the product in accordance with customer requests such as specification, quantity, delivery time, price, and the like.

However, it has been difficult for conventional mini-fabs to strictly control the lot progress management and to correctly estimate whether the product can be manufactured by following the delivery time. In semiconductor products such as LSI chips, it is considered to drastically increase business opportunities by constructing an electronic commerce using networks such as the Internet. However, since it is difficult to conduct the lot progress management and estimate the product manufacturing, it has been very difficult to implement an electronic commerce for these semiconductor products.

Hence, it has been difficult for conventional semiconductor factories to estimate whether it is possible to conduct the lot progress management and manufacture the product. This has been a cause of losing business opportunities for mini-fabs in a SOC age.

Generally, conventional typical semiconductor factories use as many as dozens of apparatuses for the same purpose at various processes. The same type of apparatuses process many lots, making it difficult to control a flow of lots. As a system for controlling a flow of lots, there is provided the software called "ManSim" from TYECIN Systems, Inc. Input information includes apparatuses used for each process of a product, processing times, apparatus groups, and the like. Lots are allowed to flow on a computer virtually. The system aims at controlling a flow of lots, optimizing production lines, and conducting production scheduling.

To optimize production lines and conduct production scheduling, it is necessary to transfer various information such as lot progress information on an actual production line, information about apparatus states, product's process information, and the like to a computer system. A progress estimate is computed through the use of these types of information as input data. The resulting information needs to be transferred to the actual production line as a work instruction. However, on a large-scale production system characterized by a monthly production of several thousand lots, the progress estimate is computed by simplifying various processes due to restrictions on computer throughput. Accordingly, such a system does not necessarily conduct accurate simulation.

A similar method is proposed in Jpn. Pat. Appln. KOKAI Publication No. 10-207506. The manufacturing management system proposed therein exchanges trial production system information via shared information and uses a result of the simulation to manage a manufacturing process for the production or trial production. According to this technique, a computer system chiefly contains a device simulation function, a process simulation function, circuit, shape, logic simulations functions, and the like, but not a simulation function for flowing lots. This has been the problem of not estimating a lot flow.

FIG. 1 exemplifies a result of computing a throughput and a work period by using ManSim. In this figure, the abscissa axis shows the number of lots (work in process: WIP) within a production line. The ordinate axis shows the throughput (monthly quantity of output) and the work period. Solid lines indicates results of computing a throughput and a work period, and a dotted line indicates actual result of a throughput for reference. According to this figure, when the WIP is small, the throughput is proportional to the WIP and the work period remains constant. This state causes little wait conditions in a lot. When the WIP increases, the throughput gradient decreases gradually, and finally becomes a constant value. It is known that this throughput corresponds to the throughput of a bottlenecked apparatus. Within this region, the work period increases in proportion to the WIP.

Increasing productivity of the production line requires increasing the throughput and shortening the work period. Shortening the work period needs to decrease the number of waiting lots. In this figure, the WIP needs to be set approximately to value A. However, this is not practical because the throughput is too small. By contrast, increasing the WIP approximate to value C in the figure maximizes the throughput, but lengthens the work period. Accordingly, it is considered to be appropriate for operations to use values approximate to B in the figure.

As indicated with a broken line in FIG. 1, however, the throughput and productivity decreases due to maintenance or failures of apparatuses, inconsistent arrival of products to a bottlenecked apparatus, and the like. To prevent the throughput from decreasing, it is necessary to accurately predict the progress of lots and conduct optimal processing for increasing the throughput and shortening the work period. As mentioned above, however, a large-scale production system must simplify various processes for computation due to restrictions on computer throughput. It has been difficult to accurately estimate the progress of lots.

Besides, several choices may occur when a certain apparatus processes lots. For example, it is assumed that there is provided a batch apparatus which can process a plurality of lots at a time. When a given lot waits for processing, it is necessary to determine whether to process that lot immediately or to wait until another lot arrives. On a given apparatus, a lot with a low priority waits and a lot with a high priority is expected to occur after a specified time. In this case, it is necessary to determine whether to process the low-priority lot first or to process the high-priority lot first by suspending the low-priority lot. In addition, when there is provided a continuous process such as pre-treatment, oxidation (or CVD), and then post-treatment within 24 hours, it is necessary to determine at which timing the processing should start.

There may be a variety of methods for selecting an optimal one from a plurality of choices as mentioned above depending on situations. Above-mentioned ManSim uniquely determines a rule for selecting choices and computes a lot progress under the corresponding condition. When the above-mentioned choices occur, ManSim is incapable of such computation, also offering a serious problem to be solved.

As described above, various processes need to be simulated in actual production line for optimizing semiconductor production line and scheduling the production. The actual situation is that various processes are simplified for computation due to restrictions on the computer throughput. Accurate simulation has been difficult. For this reason, it has been difficult to accurately estimate a lot progress. A method of selecting optimal one from a plurality of choices depends on situations. A prior art makes it difficult to select an optimal choice.

BRIEF SUMMARY OF THE INVENTION

It is an object of the present invention to provide an electronic commerce method and a system thereof capable of lot progress management and correctly determining possibilities of product manufacturing thereby expanding business opportunities.

It is another object of the present invention to provide a production system, production method, production equipment design system, production equipment design method, and production equipment manufacturing method capable of accurately simulating various processes in an actual production line and implementing effective operations especially in a relatively small-scale factory.

For the above-mentioned problems, one embodiment of the present invention provides the following configurations.

Namely, one embodiment of the present invention provides an electronic commerce method for an agent manufacturing or selling semiconductor products and a purchaser purchasing semiconductor products to conduct an electronic commerce, the method comprising the steps of: connecting a client terminal used by a purchaser or his or her proxy to a virtual production line so constructed as to simulate production processes in a real production line for manufacturing semiconductor products on a computer; receiving a purchaser-requested condition for a purchaser-requested product from the client terminal; simulating realtime whether the purchaser-requested product flows on a virtual production line according to a purchaser-requested condition; and determining whether a product is manufactured according to a purchaser-requested condition.

Besides, another embodiment of the present invention provides an electronic commerce method for an agent manufacturing or selling semiconductor products and a purchaser purchasing semiconductor products, to conduct an electronic commerce by using a network, the method comprising the steps of: connecting via network a client terminal used by a purchaser or his or her proxy to a virtual production line so constructed as to simulate production processes in a real production line for manufacturing semiconductor products on a computer; inputting a purchaser-requested product and conditions from the client terminal and transferring this input information to the virtual production line; simulating realtime whether a product flows on the virtual production line according to a purchaser-requested condition based on the product and conditions input to the virtual production line; transferring a simulation result in the virtual production line to the client terminal; determining whether to effectuate a business transaction from the client terminal in response to a result of the simulation; and issuing an instruction for manufacturing semiconductor products from the virtual production line to the real production line.

Still another embodiment of the present invention provides an electronic commerce method concerning semiconductor products for a purchaser purchasing semiconductor products to have electronic commerce with an agent manufacturing or selling semiconductor products by using a network, the method comprising the steps of: connecting via network a client terminal used by a purchaser or his or her proxy to a virtual production line so constructed as to simulate production processes in a real production line for manufacturing semiconductor products on a computer; inputting a product to be purchased and conditions thereof from the client terminal; receiving a result of simulating realtime at the client terminal whether a product flows on the virtual production line according to a purchaser-requested condition based on the input product and conditions; and responding whether to purchase a semiconductor product from the client terminal in response to the received simulation result.

Still yet another embodiment of the present invention provides an electronic commerce method concerning semiconductor products for an agent manufacturing or selling semiconductor products to have electronic commerce with a purchaser purchasing semiconductor products by using a network, the method comprising the steps of: connecting via network a client terminal used by a purchaser or his or her proxy to a virtual production line so constructed as to simulate production processes in a real production line for manufacturing semiconductor products on a computer; receiving a product and conditions at the virtual production line input from the client terminal; simulating realtime whether a product flows on the virtual production line according to a purchaser-requested condition based on the product and conditions transferred to the virtual production line; transferring a result of the simulation to the client terminal; determining whether a transaction is effectuated according to a response from the client terminal based on the simulation result; and issuing an instruction for semiconductor product manufacturing from the virtual production line to the real production line when a transaction is effectuated according to the determination.

Yet still another embodiment of the present invention provides an electronic commerce system, comprising: a virtual production line so constructed as to simulate production processes in a real production line for actually manufacturing semiconductor products on a computer; and a connection server for connecting the virtual production line to a client terminal via a network, wherein: the connection server transfers conditions input from the client terminal to the virtual production line and transfers to the client terminal a result of realtime simulation whether a product flows on the virtual production line according to a transferred condition.

Still yet another embodiment of the present invention provides an electronic commerce system, comprising: a virtual production line providing a computer with substantially the same functions as for a real production line actually manufacturing products; first transferring means configured to transfer various information about the real production line to the virtual production line; computing means configured to compute an optimal lot progress on the virtual production line based on the transferred information; second transferring means configured to transfer work instruction data based on a result of the computation to the real production line; and a connection server configured to connect the virtual production line to a client terminal via a network, wherein: conditions input from the client terminal are transferred to the virtual production line via the connection server transfers; realtime simulation is performed to determine whether a product flows on a virtual production line under transferred conditions; a simulation result is transferred to the client terminal via the connection server; and a transaction is effectuated based on a simulation result.

In the above embodiments of the present invention, a user such as a sales representative or a customer connects to a virtual production line via network. The user inputs a specified LSI product name, specification, delivery time, price, and the like and simulates whether such a product can be manufactured on the virtual production line. When a result from the simulation shows that the product can be manufactured, a transaction is initiated and a work instruction is issued to an actual production line. Even when a result from the simulation shows that the product cannot be manufactured, the user can change the semiconductor product's specification, quantity, delivery time, price, and the like. When an acceptable solution is obtained, a transaction is initiated and a work instruction is issued to an actual production line.

Here, the virtual production line is designed to use a computer for simulating production processes in an actual production line which manufactures semiconductor products. A simulation using the virtual production line makes it possible to correctly determine possibilities of managing a lot progress and manufacturing the product on the actual production line. Consequently, this allows mini-fabs in the SOC age to effectuate the electronic commerce for semiconductor products and enlarge business opportunities.

Yet still another embodiment of the present invention provides a production system, comprising: a virtual production line providing a computer with substantially the same functions as for a real production line actually manufacturing products; receiver configured to receive various information about the real production line by using the virtual production line; computing means configured to compute an optimal lot progress on the virtual production line based on the received information; and transferring means configured to transfer work instruction data based on a result of the computation to the real production line.

Still yet another embodiment of the present invention provides a manufacturing method of using a virtual production line provided with substantially the same functions in a computer as for a real production line actually manufacturing products, performing simulation in a virtual production line, and enabling efficient operations in a real production line, the method comprising the steps of: receiving various information about the real production line by means of the virtual production line; computing an optimal lot progress in the virtual production line based on the received information; and transferring work instruction data based on a result of the computation to the real production line.

The above described embodiment of the present invention provides a virtual factory (virtual production line) for virtually manufacturing products including trial products The virtual factory aims at effectively operating the production line in a factory, especially a relatively small-scale semiconductor factory (actual production line referred to as a mini-fab) whose monthly production is several thousand lots or less. There are provided lot progress information from an actual production line actually manufacturing products and information about apparatus situations. These pieces of information are transferred to the virtual production line. A lot progress estimate is computed using input data including these pieces of information and product process information maintained in the virtual production line. As an output, the computation result includes information about an optimal processing lot, order, and the like. The output is transferred to the actual production line as a work instruction.

During computation of the lot progress estimate using lot progress information, information about apparatus situations, and product's process information as input data, several choices may occur when a given apparatus processes lots. For example, it is assumed that there is provided a batch apparatus which can process a plurality of lots at a time. When a given lot waits for processing, it is necessary to determine whether to process that lot immediately or to wait until another lot arrives. When another lot is expected to arrive soon, it is considered to be beneficial to await that lot. When another lot is not expected to arrive soon, it is considered to be beneficial to process the current lot only. Accordingly, an optimal processing method is considered to vary with situations. On a given apparatus, a lot with a low priority waits and a lot with a high priority is expected to occur after a specified time. In this case, it is necessary to determine whether to process the low-priority lot first or to suspend it.

The above embodiment of the present invention computes all or part of these various choices. When there is a plurality of choices, a lot progress is estimated with respect to all or partial combinations of these choices. This operation is performed during a computation time specified by the input data.

There are several to dozens of apparatuses of the same type in a large-scale semiconductor factory which monthly produces approximately fifty to sixty thousand wafers or more. The above-mentioned combinations necessitate a great amount of computations. Practically, it has been difficult to perform such computations. By contrast, at least one or up to several apparatuses of the same type are used in a semiconductor-factory which monthly produces several thousand wafers or less. There are provided apparatuses which easily cause a plurality of choices such as apparatuses for charging a plurality of lots. These apparatuses occupy one third or less of the whole. A chance of making choices is smaller than the large-scale semiconductor factory which monthly produces approximately fifty to sixty thousand wafers or more. Accordingly, the number of combinations decreases, making it possible to extend the time for lot progress computation.

More specifically, a conventional large-scale factory just computes a progress for, say, 10 minutes due to restriction of a computer. By contrast, a mini-fab according to the present invention can compute a progress for, say, a week using the same computer, ensuring a practical use. Based on this lot progress estimate, it is possible to determine an optimal processing method or sequence with reference to specially input conditions for determining an optimal processing method or sequence. This processing method is transferred to the production line as a work instruction. As a result, the lots flow efficiently, shortening the work period and improving throughput. Accordingly, this improves productivity of semiconductor wafer manufacturing.

The use of this method for manufacturing semiconductor wafers enables prioritized processing for products with high priorities and efficient processing for products with low priorities within an available range. Further, it is possible to optimize the maintenance or a sequence of lot processing when an apparatus is being maintained or is to be maintained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 exemplifies a monitor screen for selecting device specification choices;

FIGS. 6A and 6B exemplify monitor screens for entering device specifications;

FIG. 7 exemplifies a monitor screen displaying an answer for a price according to a ordered quantity and a delivery time;

FIG. 8 exemplifies a monitor screen for entering a quantity to be ordered and a delivery time;

FIG. 9 exemplifies a monitor screen displaying an available delivery time and price from a device manufacturer;

FIGS. 13A to 13E lists input data and output data for the lot progress computation using a semiconductor production system according to the second embodiment;

FIG. 19 shows characteristic curves for electric power or power usage of apparatuses registered in the virtual factory 13 performing the electric power leveling;

FIG. 21 describes a production system according to a third embodiment;

FIGS. 22A to 22C describe a production system without power leveling;

FIGS. 22D to 22F describe a production system with power leveling; and

DETAILED DESCRIPTION OF THE INVENTION

Embodiments of the present invention will be described in further detail with reference to the accompanying drawings.

First Embodiment

Figure 1:
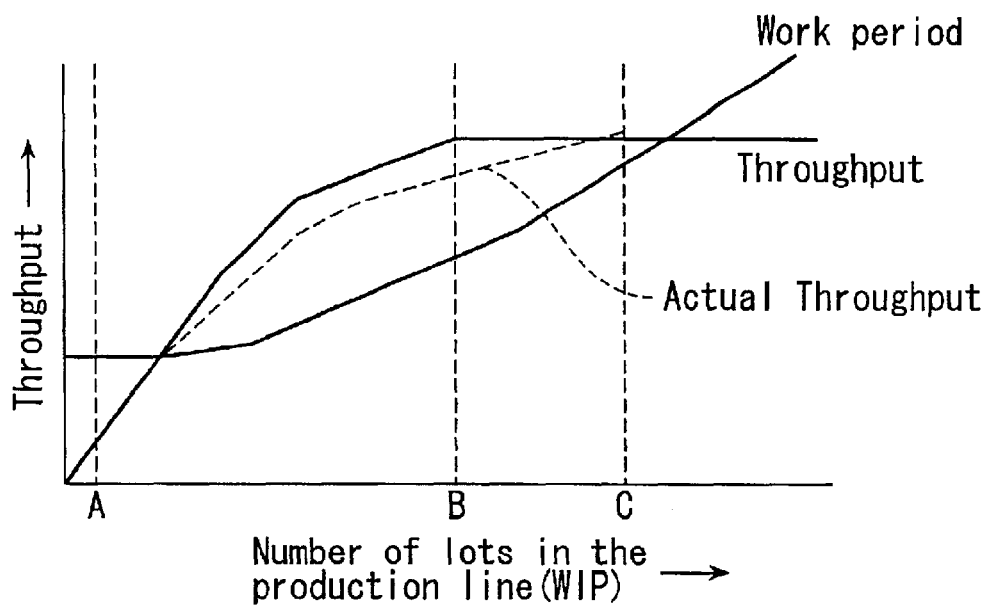
FIG. 1 exemplifies a result of computing a throughput and a work period according to a prior art using ManSim.
Figure 2:
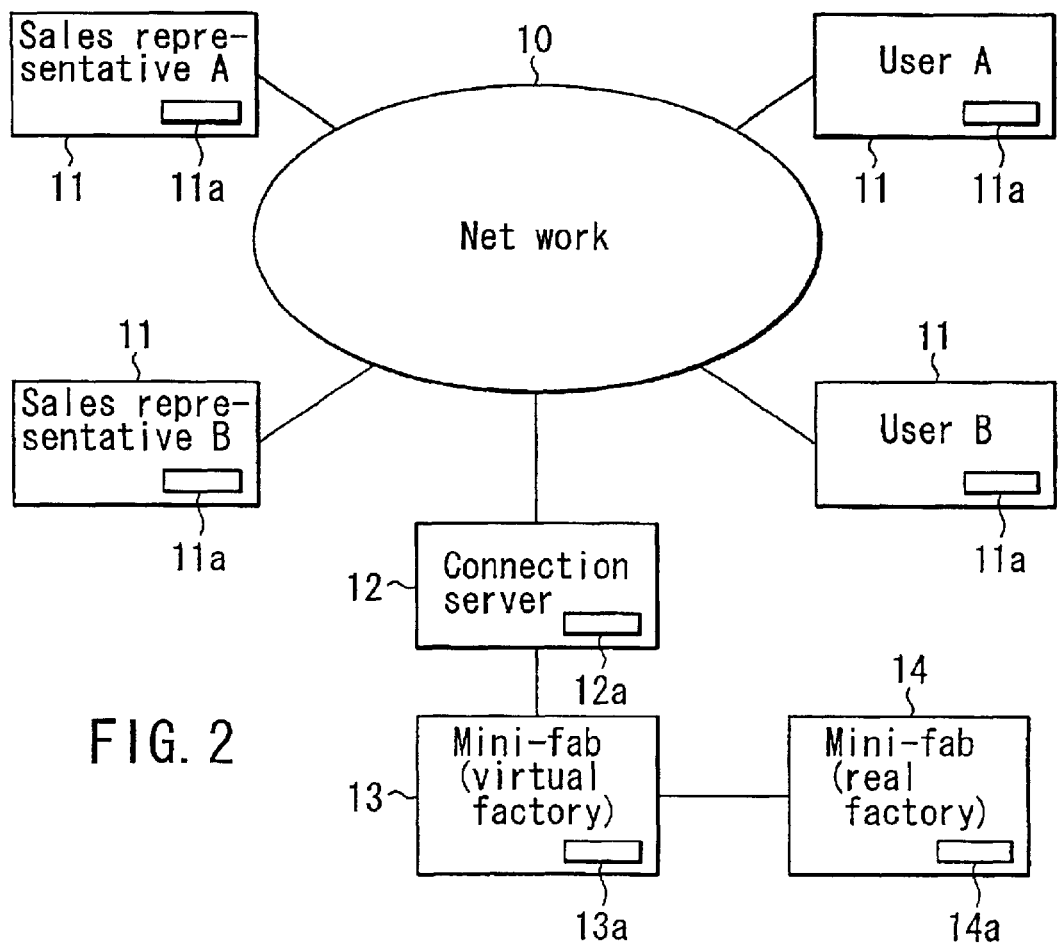
FIG. 2 is a block diagram showing an entire configuration of an electronic commerce system for semiconductor products according to a first embodiment.

FIG. 2 is a block diagram showing an entire configuration of an electronic commerce system for semiconductor products according to a first embodiment of the present invention.

A network 10 is a computer network such as Internet. The system implements an electronic commerce via this network 10.

The network 10 connects with a plurality of client terminals 11 and a connection server 12. The client terminal 11 is operated by a customer such as a user or a sales representative and can be an Internet-connectable personal computer or mobile telephone. The connection server 12 connects with a virtual factory (virtual production line) 13 referred to as a mini-fab. The connection server 12 exchanges various data between the client terminal 11 and the virtual factory 13. The virtual factory 13 is connected to a real factory 14 as a mini-fab which actually manufactures semiconductor products as will be described later. The virtual factory 13 is implemented by, say, a computer system and virtually constructs various processes in the real factory 14 on the computer. The client terminal 11, the connection server 12, the virtual factory 13, and the real factory 14 include transfer/reception means 11a, 12a, 13a, and 14a for transferring and receiving various information during communication with the network 10 and the like.

Various information in the real factory 14 is manually or automatically transferred to the virtual factory 13. The virtual factory 13 simulates a lot progress estimate within a specified time range using input data transferred from the real factory 14 such as lot progress information and apparatus state information at a specified time. A simulation result from the virtual factory 13 is transferred to the real factory 14 as a work instruction. Based on this instruction, for example, a worker is notified at which time a given apparatus should complete lot processing, which lot should be input to that apparatus, where to move the completed lot next, or to which transport apparatus the lot should be moved, and the like.

Figure 3:
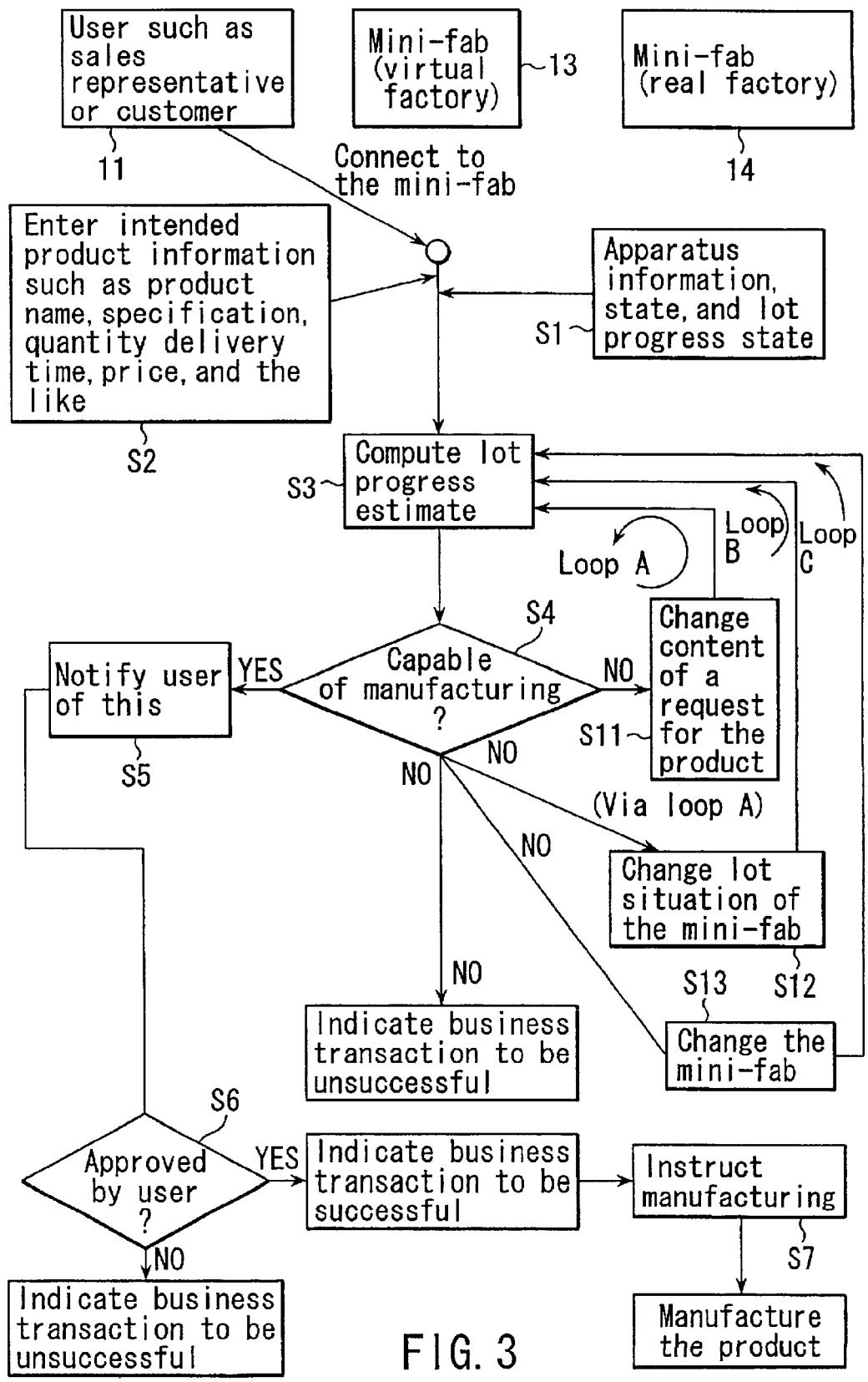
FIG. 3 is a flowchart explaining a flow f entire processing according to the first embodiment.

The following describes an electronic commerce according to this embodiment with reference to a flowchart in FIG. 3.

The virtual factory 13 regularly manages lot progress situations and apparatus states in the real factory 14 and is prepared to compute a lot progress equivalent to the real factory 14 (step S1). Specifically, the real factory 14 transfers information about the lot progress and apparatus states to the virtual factory 13. Under this condition, a customer such as a user or a sales representative (hereafter just referred to as the user) connects to the virtual factory 13 via the network 10 and the connection server 12. The user then inputs information about an intended product such as an LSI product name, specification, quantity, delivery time, price, and the like (step S2). The input information is transferred to the virtual factory 13.

The virtual factory 13 receives each information entered at step S2 and computes a lot progress estimate based on the received information (step S3). Namely, the virtual factory 13 simulates whether the user-specified product can be manufactured. Based on the simulation result, the virtual factory 13 determines whether the product can be manufactured (step S4). When the product can be manufactured, the virtual factory 13 notifies the user of it (step S5). As a method of transmitting this information to the user, data indicating that the product can be manufactured is transmitted to the client terminal 11 via the connection server 12 and the network 10. Based on the received data, the client terminal 11 uses a monitor screen (not shown) to display the information indicating that the product can be manufactured and prompts the user to determine whether to purchase the product.

Based on the simulation result displayed on the monitor screen, the user determines whether to purchase the product (step S6). When this determination is accepted, the transaction is passed. For determining whether to purchase the product, namely whether to accept purchase of the product, input means (not shown) of the client terminal 11 is used to enter information indicating whether or not to purchase the product. When the virtual factory 13 receives information indicating purchase of the product, it is determined that the transaction is passed. In this case, the virtual factory 13 automatically or semiautomatically directs the read factory 14 to manufacture t hat product (step S7). In an automatic case, after it is determined that the transaction is passed, the computer is used for issuing a work instruction to the real factory without a human operation. In a semiautomatic case, after it is determined that the transaction is passed, an operator for the virtual factory 13 is prompted to determine whether to issue a work instruction. After interrupt of a human operation such as confirming or entering the work instruction by the operator, the computer is used for issuing a work instruction to the real factory.

Loop A is used when a computation result shows that the intended product cannot be manufactured at step S4. Specifically, loop A modifies the user's request such as the specification, quantity, delivery time, price, and the like (step S11). Based on this modified information, the virtual factory 13 re-simulates if such a product can be manufactured. Namely, the lot progress estimate is re-computed under the condition of the modified user request (step S3). Based on the computation result, it is determined whether the product can be manufactured (step S4). When the computation result shows that the LSI chip can be manufactured according to the modified user request, this result is transmitted to the user (step S5). At this time, the content of the modified request is also transmitted. When the user accepts it, the transaction is passed. The acceptance by the user is performed by the user's action to input information indicative of acceptance by input means (not shown).

Loop B is used when the product cannot be manufactured after modifying the user request. Specifically, the lot situation is varied in the virtual factory 13 (step S12). The virtual factory 13 re-simulates whether such a product can be manufactured. Namely, the lot progress estimate is re-computed under the condition of the modified lot situation (step S3). Based on the computation result, it is determined whether the product can be manufactured (step S4). For example, there may be the case where the real factory 14 maintains many products with the high priority. After these products are completed, it is expected to decrease lots in the real factory 14. In this case, the virtual factory 13 simulates whether the product can be manufactured by delaying a lot casting. When the computation result shows that the LSI chip can be manufactured according to the condition of the delayed lot casting, this result is transmitted to the user (step S5). At this time, the user is notified of the delayed lot casting and the delivery time. When the user accepts it, the transaction is passed.

Loop C is used when none of the above-mentioned loops enables the manufacture. Specifically, another mini-fab is selected (step S13) to perform the same operations as mentioned above and determine whether the product can be manufactured (step S4). Namely, a lot progress estimate is computed with respect to another mini-fab (step S3). Based on the computation result, it is determined whether the manufacture is possible (step S4). When the computation result shows that the manufacture is possible, this result is transmitted to the user (step S5). When the manufacture is determined to be impossible, the simulation is reexecuted by using loops A and B for finding manufacturable conditions. When the manufacture is impossible on another mini-fab, the transaction is unsuccessful. When another mini-fab is capable of the manufacture, this result is transmitted to the user. When the user accepts the notification from the mini-fab, the transaction is passed.

Figure 4:
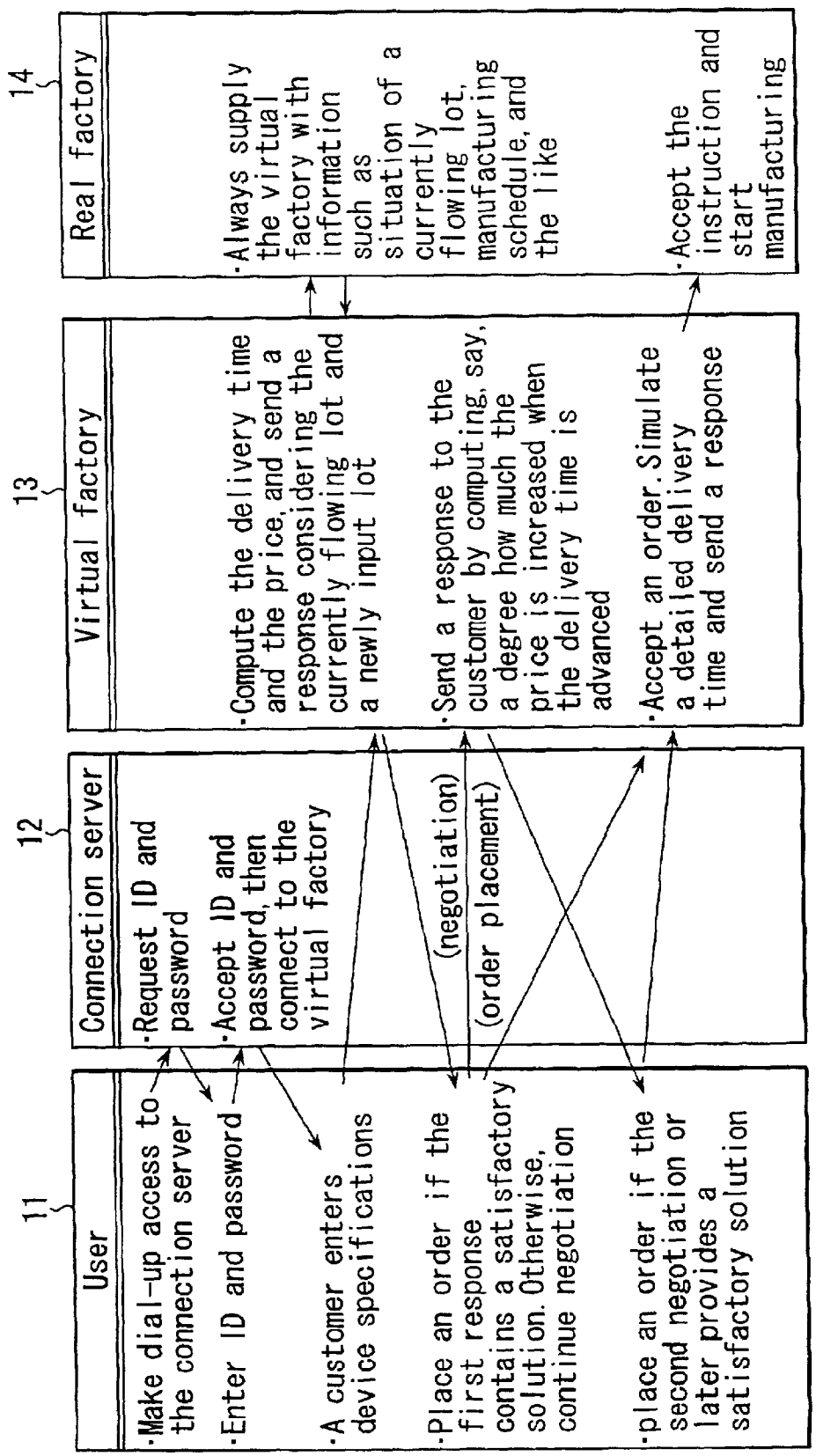
FIG. 4 is a flowchart explaining a flow of entire processing according to the first embodiment.

The above-mentioned processing is described in more detail with reference to a flowchart in FIG. 4 and monitor screens in FIGS. 5 to 11.

When the user makes dial-up access to the connection server 12 from the client terminal 11, the server 12 requests an ID and a password. When the user enters the ID and the password, the connection server 12 accepts the ID and the password if they are correct and then connects to the virtual factory 13. Concurrently, a monitor screen of the client terminal 11 displays screen 1 for entering device specifications as shown in FIG. 5.

Screen 1 allows the user to select either of the following.

(1) Entering a function and finding the device configuration as a solution (2) Selecting a device configuration from options to configure the system As shown in FIG. 6A, screen 2a is used for specifying device functions. As shown in FIG. 6B, screen 2b is used for specifying a device configuration and parts. On screen 2a, the user enters parts needed for the system. On screen 2b, the user selects parts constituting the SOC.

When the user enters the device specification, the server 12 sends it to the virtual factory 13. Situations of the current lots, manufacturing schedules, and the like are exchanged realtime between the virtual factory 13 and the real factory 14. Accordingly, the virtual factory 13 can perform a simulation in consideration of the currently flowing lots and a newly input lot. The virtual factory 13 finds a delivery time and a price based on the currently flowing lots and a newly casting lot, and then sends an answer to the client terminal 11 via the server 12. At this time, say, screen 3 as shown in FIG. 7 is displayed on the monitor screen of the client terminal 11.

Figures 10, 11:
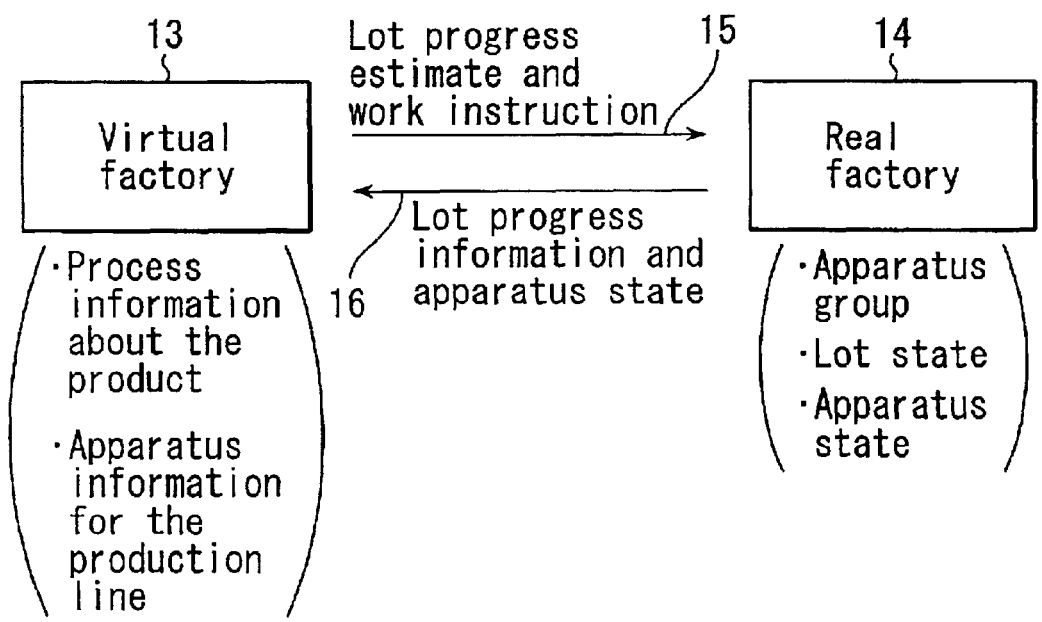
FIG. 10 exemplifies a monitor screen for renegotiating a delivery time and a price.
FIG. 11 is a block diagram describing a second embodiment and exemplifying a semiconductor production system used for the electronic commerce method of the present invention.

When proceeding to the next screen after referencing screen 3, the user selects the NEXT button on screen 3. In response to this button selection, the virtual factory 13 displays screen 4 as shown in FIG. 8 on the monitor screen of the client terminal 11. Following this screen 4, the user enters necessary items such as quantity and delivery time. The virtual factory 13 receives these necessary items (quantity and delivery time) and searches for a solution which satisfies these conditions. The virtual factory 13 displays screen 5 in FIG. 9 as a first solution on the client terminal 11, providing the user with the possible delivery time and price (first solution). When the first solution is satisfactory, the user can place an order. When the first solution is unsatisfactory, the user notifies this to the virtual factory 13. In response to this notification, the virtual factory 13 displays screen 6 as shown in FIG. 10 on the monitor screen of the client terminal 11 for further negotiation with the user. When the user responds to the negotiation, the virtual factory 13 returns an answer by computing, say, how much the price is raised if the delivery time is expedited. This answer is presented to the user by displaying necessary information on the monitor screen of the client terminal 11. When the second transaction provides a satisfactory solution, the user can place an order. When the user places an order, the virtual factory 13 accepts the order and finds a detailed delivery time by means of the simulation and returns an answer to the user. Concurrently, the virtual factory 13 issues an instruction to the real factory 14. According to this instruction, the real factory 14 starts manufacturing the product.

According to this embodiment, the virtual factory 13 is constructed so that the computer is used to simulate production processes in the real factory 14 which manufactures semiconductor products. The user such as a sales representative or a customer connects to the virtual factory 13 via a network 10 and enters an intended LSI product name, specification, delivery time, price, and the like. The virtual factory 13 simulates whether a specified product can be manufactured, correctly estimating whether the real factory 14 can manage the lot progress and manufacture the product.

When the above-mentioned simulation yields a manufacturable result, the transaction is passed. A work instruction is issued to the real factory 14. Even when the simulation yields an unfeasible result, the virtual factory 13 varies the semiconductor product's specification, quantity, delivery time, price, lot situation, mini-fab for manufacturing, and the like. When an allowable solution is obtained, the virtual factory 13 passes the transaction and issues a work instruction to the real factory 14. This enables electronic commerce for semiconductor products in SOC-oriented mini-fabs and greatly expands business opportunities.

The following paragraphs (1) to (9) describe examples of actual electronic commerce using the electronic commerce system according to this embodiment.

(1) A sales representative made the virtual factory 13 simulate an intended product according to a user-requested condition. A simulation result showed that the product was processed smoothly and could be manufactured. The transaction was passed and a work instruction was issued via the virtual factory 13.

(2) A sales representative made the virtual factory 13 simulate an intended product according to a user-requested condition. A simulation result showed that the product couldn't be manufactured. The process was re-simulated by changing the delivery time. The result showed that the product could be manufactured if the delivery time was delayed for 10 days. The user was notified of this result and accepted it. The transaction was passed and a work instruction was issued via the virtual factory 13.

(3) A sales representative made the virtual factory 13 simulate an intended product according to a user-requested condition. A simulation result showed that the product couldn't be manufactured. The process was re-simulated by changing the operating frequency specification. The re-simulated result showed that some part of choices which can omit some procedures could be selected. Then the choices were selected thereby to show shorter processing time and lower cost. In this case, the re-simulated result also showed that the product could be manufactured if the operating frequency specification was reduced for 50 MHz since the shorter processing time and lower cost as the re-simulated result met the user-requested condition. The user was notified of this result and accepted it. The transaction was passed and a work instruction was issued via the virtual factory 13.

(4) A sales representative made the virtual factory 13 simulate an intended product according to a user-requested condition. A simulation result showed that the product couldn't be manufactured since the result didn't meet the user-requested condition. The process was re-simulated by changing the price. The result showed that the product could be manufactured on condition that the price was raised for 7% since the raised price met the re-simulated result. The user was notified of this result and accepted it. The transaction was passed and a work instruction was issued via the virtual factory.

(5) A sales representative made the virtual factory 13 simulate an intended product according to a user-requested condition. A simulation result showed that the product couldn't be manufactured. The process was re-simulated by changing the quantity and the delivery time. The result showed that the product could be manufactured if the quantity was decreased by 10% or the delivery time was delayed for 7 days. The user was notified of this result and accepted it by selecting the latter. The transaction was passed and a work instruction was issued via the virtual factory.

(6) A sales representative made the virtual factory 13 simulate an intended product according to a user-requested condition. A simulation result showed that the product couldn't be manufactured even if the conditions were changed. The sales representative connected to a virtual factory capable of simulating another mini-fab and performs the similar computation to obtain a manufacturable result. The user was notified of this result and accepted it. The transaction was passed and a work instruction was issued via the virtual factory 13.

(7) A sales representative made the virtual factory 13 simulate an intended product according to a user-requested condition. A simulation result showed that the product couldn't be manufactured even if the conditions were changed. The result also showed that there was the high possibility of completing a product with the high priority two or three days later and enabling the intended product to be manufactured. After a wait state is enabled, a result was obtained to show that the product could be manufactured according to the user-requested conditions three days later. The user was notified of this result and accepted it. The transaction was passed and a work instruction was issued via the virtual factory 13.

(8) Two users made an inquiry almost at the same time. A sales representative made the virtual factory 13 simulate intended products for these users according to user-requested conditions. A simulation result showed that the products could not be manufactured concurrently even if the conditions were changed. Of these users, the sales representative selected the user's product which more profits the mini-fab or causes a smaller load to the mini-fab, and made the virtual factory 13 simulate that product. The result showed that the product could be manufactured. The users were notified of this result and accepted it. The transaction was passed and a work instruction was issued via the virtual factory 13.

As mentioned above in detail, this embodiment provides a networked electronic commerce between an agent manufacturing and selling semiconductor products and a purchaser purchasing semiconductor products. A client terminal 11 operated by the purchaser or his or her proxy is connected to a computer which installs a virtual production line 13 capable of using the computer to simulate production processes in an actual production line 14 for manufacturing semiconductor products. A realtime simulation is performed whether the virtual production line 13 can process a purchaser-requested product under purchaser-requested conditions. It is determined whether the product can be manufactured under the purchaser-requested conditions. This makes it possible to correctly estimate whether the real production line can manage the lot progress and manufacture products, greatly expanding business opportunities in electronic commerce for semiconductor products.

Second Embodiment

FIG. 11 is a block diagram exemplifying a semiconductor production system according to a second embodiment of the present invention.

There is provided a manufacturing apparatus group in the real factory 14 (real production line) which actually manufactures semiconductor products including trial products. Products flow along each real production line in this real factory 14. A computer in the real factory 14 manages a lot progress of each product. For example, a proper operation on the computer screen allows to determine which apparatus processes a given lot, whether the lot is being processed, waits for processing, or is being transported. In addition to lot progress data, the computer stores information about apparatus states such as active, idle, being maintained, failed, scheduled to be maintained, and the like.

Various information in the real factory 14 is manually or automatically transferred to the virtual factory 13 (virtual production line) via the network as a data transmission medium 16. In a manual operation, a computer operator for the real factory 14 enters various information. In an automatic operation, various sensors detect various states in the real factory 14. The sensed data is transferred to the virtual factory 13. Various information in the real production line 14 includes order volumes for each production, lot progress situations, apparatus situations (operating states, performance, defect occurrences, QC states, time until schedule maintenance, and time needed for scheduled maintenance), worker situations (duty states and working states), product's test results, and the like.

The virtual factory 13 constructs the same functions as for the real factory 14 on a computer. More specifically, the virtual factory 13 is provided with a situation assessment program for assessing operating states of the real factory 14 based on numeric information and the like representing lot progress situations, apparatus situations, worker situations, and product's test results in the real factory 14. Using this situation assessment program, the virtual factory 13 provides a function of deriving operating situations in the real factory 14 by means of simulation. Apparently, means for deriving simulation results based on various information is not limited to software. It may be preferable to use specified hardware as a constituent element of means for deriving simulation results.

The present computer performance makes it impossible to virtually implement same functions as for a large-scale semiconductor factory which manufactures approximately fifty to sixty thousand or more wafers. Accordingly, this embodiment aims mainly at a relatively small-scale semiconductor factory with monthly production of several thousand wafers or less. However, a large-scale semiconductor factory can be divided into small portions and can be assumed to be a collection of small-scale factories. In this case, even the present computer system can provide same functions as for respective small-scale factories.

In the virtual factory 13 according to this embodiment, the computer stores product's process information and information about an apparatus group available on real production lines or an apparatus under discussion on introduction to the production line. The product's process information indicates in which apparatus group a given product is processed, how the product is processed, and how long it takes to complete each process. A lot progress estimate within a specified time range is simulated by using input data, namely the lot progress information and the apparatus state information at a given time transferred from the real factory 14.

A simulation result in the virtual factory 13 is transferred to the real factory 14 as a work instruction via the network as a data transmission medium 15. For example, a worker is notified at which time a given apparatus should complete lot processing, which lot should be cast to that apparatus, where to move the completed lot next, or to which transport apparatus the lot should be moved, and the like. The following operations are repeated realtime: transferring various information from the real factory 14 to the virtual factory 13; computing management of an optimal lot in the virtual factory 13; and transferring work instruction data from the virtual factory to the real factory 14. Paragraphs (1) through (9) to follow explain examples of instruction contents under various conditions.

Figure 12:
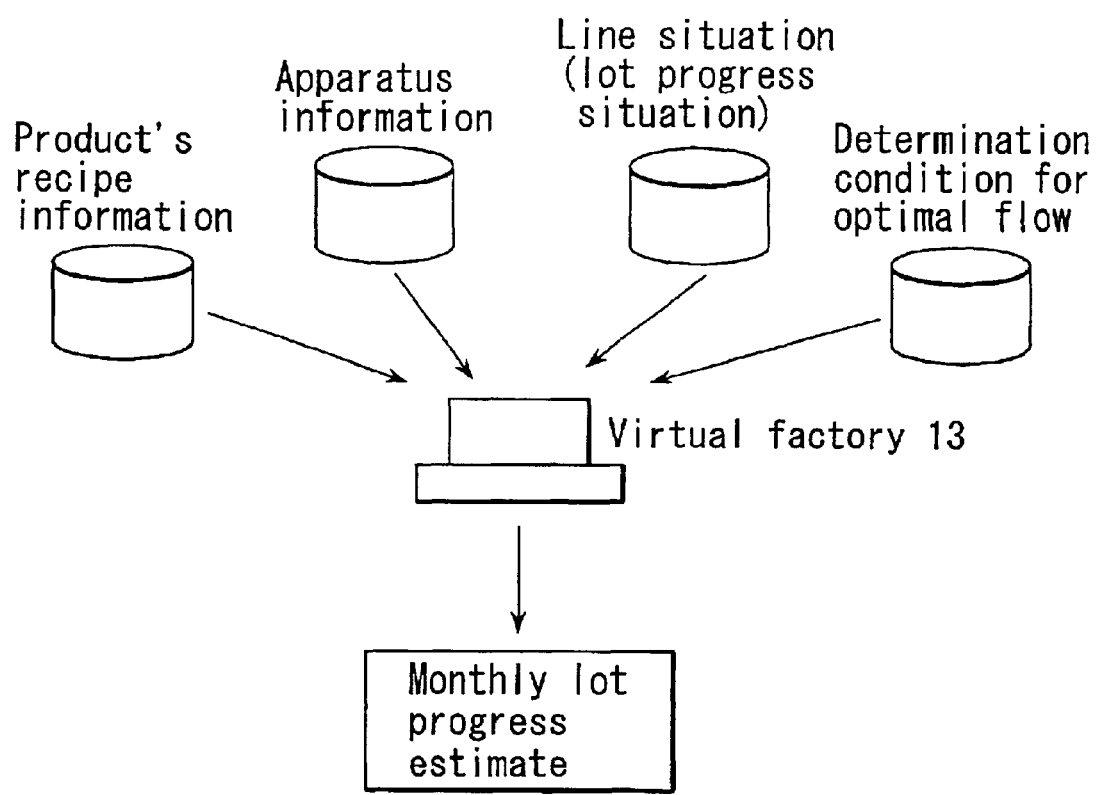
FIG. 12 is a schematic diagram illustrating lot progress computation using a semiconductor production system according to the second embodiment.
Figure 14:
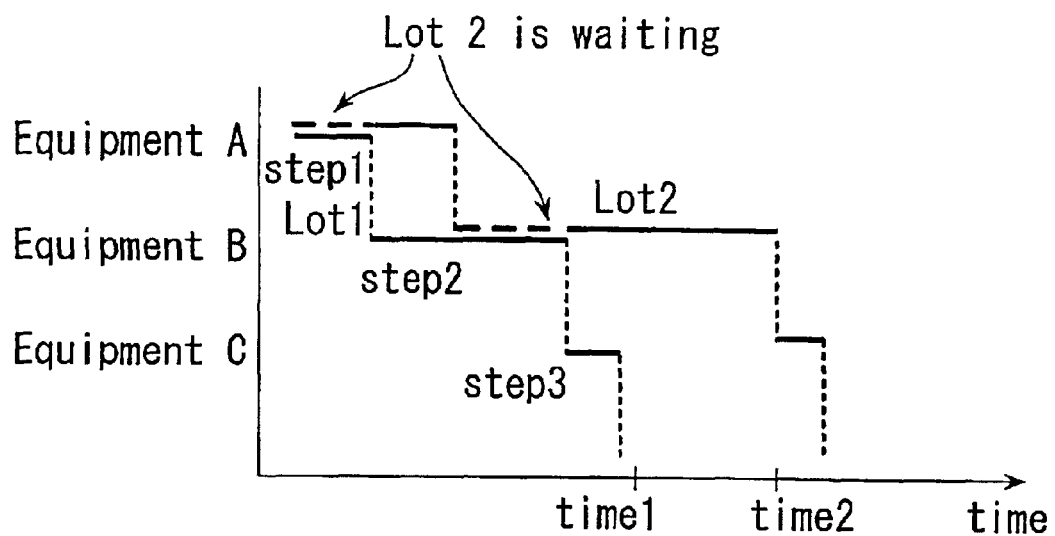
FIG. 14 shows a lot flow without awaiting completion of another lot processing identified at one point in a virtual factory 13 according to the second embodiment.

The following describes operations of the semiconductor production system in which the virtual factory 13 computes a lot progress using information transferred from the real factory 14. As shown in FIG. 12, the virtual factory 13 is supplied with product recipe information, apparatus information, line situations (lot progress situations), and conditions for determining an optimal lot flowing. The virtual factory 13 computes a lot progress based on this input data and outputs a lot progress estimate result, say, for a month. FIGS. 13A to 13E exemplifies product recipe information (FIG. 13A), apparatus information (FIG. 13B), line situations (lot progress situations, FIG. 13C), conditions for determining an optimal lot flowing (FIG. 13D), and a monthly lot progress estimate (FIG. 13E). FIG. 14 schematically shows a lot flow at a given time.

Figure 16:
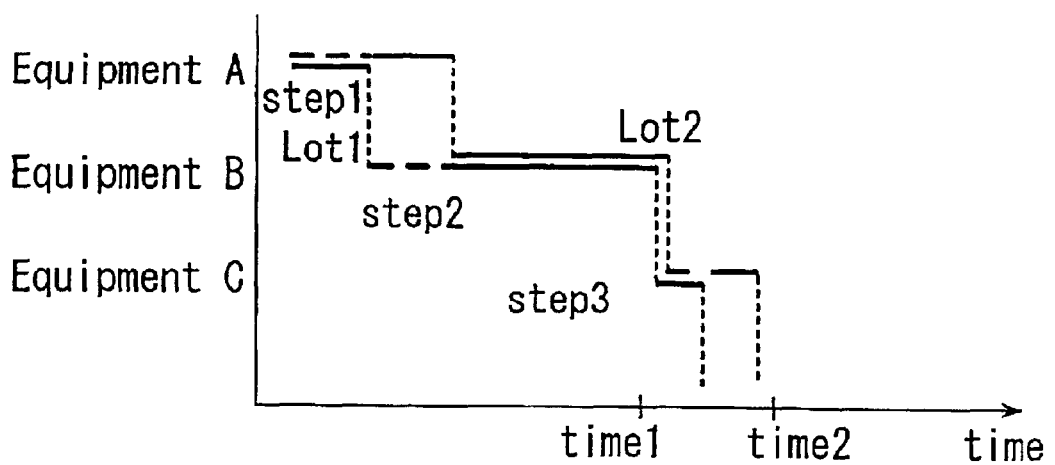
FIG. 16 shows a lot flow by awaiting completion of another lot processing identified at one point in a virtual factory 13 according to the second embodiment.
Figure 15:
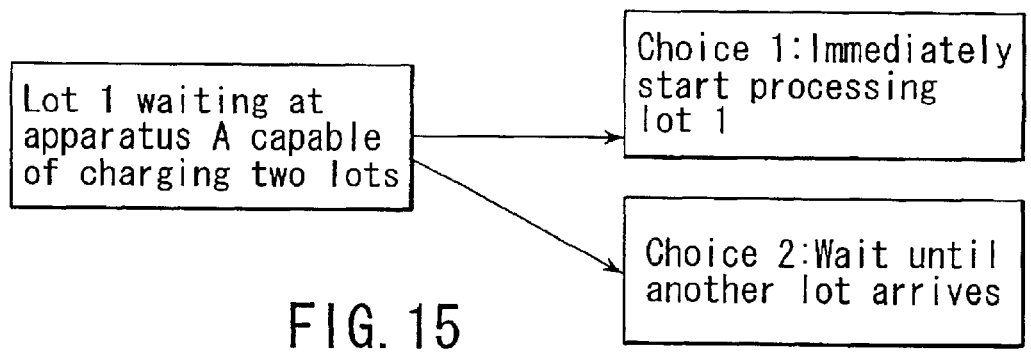
FIG. 15 describes a second embodiment, exemplifying choices available when a lot progress is estimated.

When the above-mentioned lot progress estimate is computed, there may be provided two or more choices for various processing methods or sequences. For example, it is assumed that there is provided a batch apparatus which can process a plurality of lots at a time. When a given lot waits for processing, it is necessary to determine whether to process that lot immediately or to wait until another lot arrives. FIG. 15 shows an example of this case. FIG. 14 shows the case when choice 1 in FIG. 15 is selected. Specifically, this example shows a lot progress for processing Lot 1 without awaiting a second Lot 2 in a second process (equipment B). FIG. 16 provides a lot progress example when choice 2 in FIG. 15 is selected. Specifically, in FIG. 16, Lot 1 is processed by awaiting the second Lot 2 in the second process (equipment B). In FIG. 14 and 16, a first process is performed by equipment A, the second process is performed by equipment B, and a third process is performed by equipment C.

By comparing FIGS. 14 and 16, the work period for Lot 1 comprising three processes (including the first process to the third process) is longer in FIG. 16 than in FIG. 14. However, the work period for Lot 2 is shorter in FIG. 16 than in FIG. 14. In case the entire process consists of the three process, the output at time 1 in FIG. 14 is 1 (lot), the output at time 1 in FIG. 16 is 0 (lot), the output at time 2 in FIG. 14 is 1 (lot), and the output at time 2 in FIG. 16 is 2 (lot). For example, if the date of delivery is time 1, the lot progress in FIG. 14 is preferable. On the other hand, if the date of delivery is time 2, the lot progress in FIG. 16 is preferable.

On a given apparatus, a low-priority lot waits and a high-priority lot is expected to occur after a specified time. In this case, it is necessary to determine whether to process the low-priority lot first or to suspend it.

Figure 17:
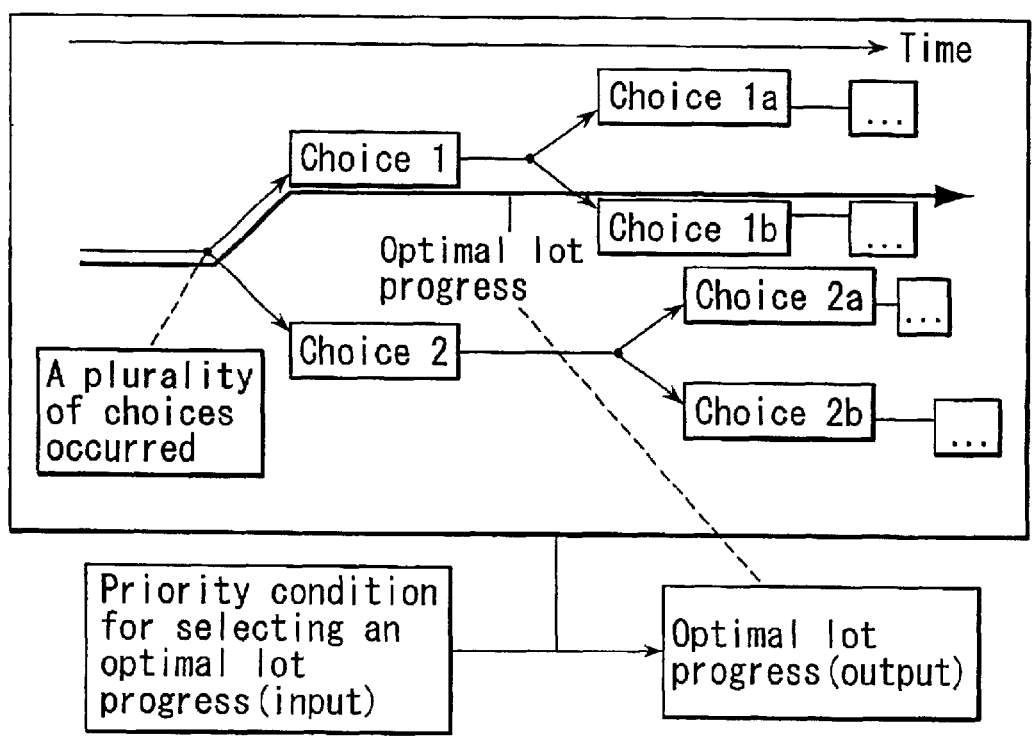
FIG. 17 describes a second embodiment, showing a procedure for selecting an optimal combination from a plurality of combinations of choices available when a lot is in process.

FIG. 17 represents these choices in a tree view. This embodiment computes a lot progress estimate for all or part of these choices. A lot progress estimate result is derived for each choice. Consequently, it is possible to compute a lot progress estimate according to the way in which various choices are selected. Thereafter, as shown in FIG. 17, an optimal lot progress is selected from the respective lot progress estimate results. For example, such a progress may increase the entire throughput to shorten a work period, process a prioritized lot in a short work period, or minimize costs. An operator needs to enter these criteria from input means (not shown) to the virtual factory 13. Namely, the operator refers to the lot progress estimate result for each choice displayed on the monitor screen connected to the virtual factory 13, sets conditions for extracting lot progresses as mentioned above, and determines an optimal lot progress. Here, the virtual factory 13 automatically selects an optimal progress from the quantity obtained from lot progress estimate computation results such as an output amount during a given period, an average work period, a high-priority production output amount, and the like according to priority conditions. Alternatively, an operator can manually select an optimal method from several progress estimate computation results as outputs.

It is unnecessary to derive lot progress estimate results with respect to all choices. It may be preferable to derive them with respect to only extraction conditions already specified by the operator.

The virtual factory 13 determines the optimal lot progress, and then issues the result as a work instruction to the real factory 14. According to this work instruction, as mentioned above, a worker is notified at which time a given apparatus should complete lot processing, which lot should be input to that apparatus, where to move the completed lot next, or to which transport apparatus the lot should be moved, and the like. Further, the virtual factory 13 issues an instruction how to select choices (how to determine processing) when various choices occur. The real factory 14 starts production according to this instruction, allowing efficient operations in the real factory 14.

This embodiment uses the real factory 14 for actually manufacturing products and the virtual factory 13 for providing a computer with essentially the same functions as for this real factory 14. The virtual factory 13 simulates production processes in the real factory 14, allowing efficient operations in the real factory 14. Especially for a small-scale semiconductor factory with monthly production of several thousand wafers or less, the virtual factory 13 can accurately simulate various processes in the real factory 14. It is possible to strictly estimate lot progresses and provide efficient operations in small-scale factories.

The following describes examples of instructions under various conditions according to this embodiment.

(1) It was assumed that a high-priority lot was to arrive at a given apparatus 15 minutes later in the real factory 14. This information was transferred to the virtual factory 13. The virtual factory 13 performed two simulations. One was to immediately start processing the current lot. The other was to suspend the current lot processing and start processing after waiting until the high-priority lot arrives. Results of both simulations provided a solution that it was appropriate to wait until the high-priority lot arrives. This result was transferred to the real factory 14 for issuing a work instruction. Consequently, it had become possible to manufacture high-priority lots in a short work period.

(2) When a given apparatus in the real factory 14 required maintenance, a simulation was performed in the virtual factory 13. The simulation provided an optimal lot progress estimate result for preferentially processing a lot subject to no or little effect of the maintenance. This result was issued as a work instruction, allowing efficient operations during apparatus maintenance in the real factory 14. The maintenance could be conducted efficiently by displaying the maintenance time, required personnel, replacement parts, supplementary procedures for the next-to-next maintenance, and the like on the computer screen at a given time before the scheduled apparatus maintenance.

(3) When the apparatus was expected to fail, a simulation was conducted in consideration of a failure in the virtual factory 13. The simulation result showed that it was appropriate to preferentially process a high-priority product. Based on this result, issuing a work instruction allowed the high-priority lot to be manufactured without delaying the work period. Action against failures could be streamlined by displaying countermeasures against failures on the computer screen or equivalent means, preventing the throughput from degrading or preventing the work period from being delayed.

(4) An abnormal value was found in data of a lot which passed a given process. The virtual factory 13 extracted a lot which passes the process and has a possibility of causing abnormal values. This lot was settled as a wait lot. According to an examination thereafter, it was found that the lot could not be a conforming article and was rejected. Thus, it had become possible to minimize an effect of process anomaly on products.

(5) A simulation in the virtual factory 13 was used to find an optimal rest break for workers. The simulation result showed that a given process terminated 10 minutes later and no work occured in 70 minutes thereafter and that it was appropriate to take a break during that period. Based on this result, an instruction was issued to take a break for 60 minutes after that process. Consequently, workers could take a break without degrading the throughput or delaying the work period.

(6) When a product to be processed was changed, the virtual factory 13 simulated whether available apparatuses were too many or too few in accordance with changes in apparatuses to be used and the time to use them. The result showed that an over-and-under problem would occur with respect to the available apparatuses. A solution for this problem was found by minimizing costs or a period for improving or replacing apparatuses to solve. The result was displayed on the computer screen or equivalent means. Based on the result, an optimal procedure of replacing apparatuses was determined and was conducted. Consequently, it had become possible to smoothly change the product.

(7) When determining an apparatus layout in the actual production line, an attempt was made to find an optimal layout according to methods of minimizing a space, a flow line, the number of workers, and power usage. As a result, a given layout was found to be an optimal solution for minimizing the space and the flow line and decreasing the number of workers and the power usage. The use of this layout improved productivity.

(8) Due to occurrence of many defects, for example, it was expected to decrease the number of products because wafers or chips for a given product are discarded. In this case, a new lot was input and processed by increasing the priority. Alternatively, a waiting lot was processed by increasing the priority in the middle of processing. Consequently, it had become possible to prevent conforming articles for the product from being greatly decreased.

(9) The virtual factory 13 conducted the inventory management of direct and indirect materials. Consequently, it had become possible to decrease the inventory of direct and indirect materials.

Modification

The present invention is not limited to the above-mentioned embodiments. The virtual factory used for the present invention need not necessarily implement strictly the same processes as those for the real factory and may simulate the real factory to some extent. Accordingly, the present invention can be applied to more large-scale semiconductor factories by using current computer systems. The network is not limited to the internet and may be capable of bidirectional data communication. It is possible to apply the semiconductor product ion system according to this embodiment to the electronic commerce method as described in the first embodiment.

Though the second embodiment explains the semiconductor production system as an example, the present invention is not limited thereto. The present invention is applicable to relatively small-size liquid crystal or electric appliance factories. The present invention is also applicable to automobile factories and chemical plants. The system size (a relatively small-size factory) for the present invention corresponds to such a degree that a computer to be used can perform the same number of computations for a real line. Namely, this size is equivalent to a scope which can virtually construct the same processing as for the real line. If the computer performance is improved in the future, the present invention can be applied to more large-scale systems.

The description of this embodiment assumes that one lot comprises approximately 25 wafers, but is not limited thereto. The present invention is applicable to any number of wafers starting from one wafer per lot.

As mentioned above, this embodiment uses the real factory (real production line) for actually manufacturing products and the virtual factory (virtual production line) for providing a computer with essentially the same functions as for this real factory. Various information in the real factory is transferred to the virtual factory. Based on the transferred information, the virtual factory computes an optimal way of progressing a lot. Based on this computation result, work instruction data is transferred to the real factory. The production in the real factory is based on the transferred work instruction data. Consequently, it is possible to accurately simulate various processes in the real production line, allowing efficient operations in relatively small-scale factories.

When there is provided a plurality of choices, this embodiment computes all or part of these choices. This makes it possible to select optimal choices according to situations, operating the production system more efficiently.

Third Embodiment

This embodiment concerns a modification of the second embodiment.

The second embodiment described the cases for finding optimal processes according to purposes of processing a high-priority lot in a short work period and preferentially processing a lot subject to no or little effect of the maintenance. The third embodiment finds an optimal process for achieving an object to perform processing so that electric power does not exceed a preset value.

Figures 18, 20:
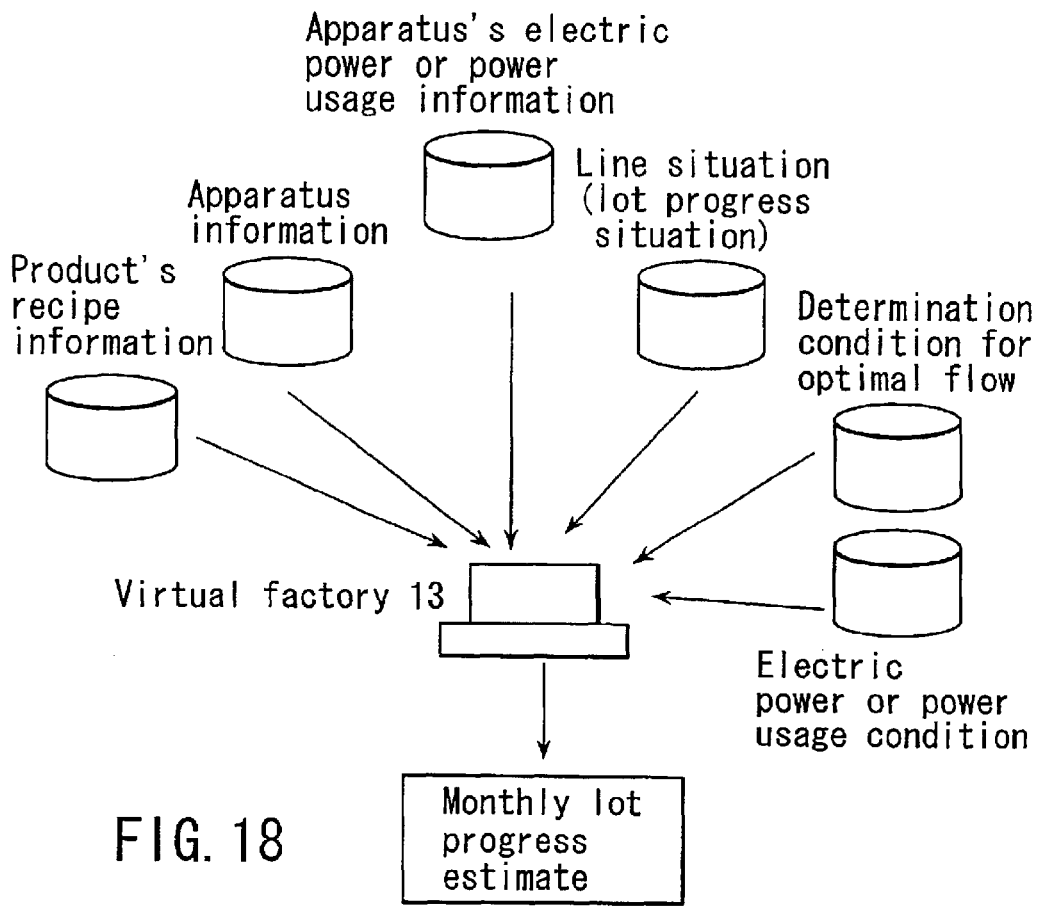
FIG. 18 shows a configuration of a virtual factory performing lot look-ahead computation capable of electric power leveling.
FIG. 20 shows an example of condition data for electric power or power usage of apparatuses registered in the virtual factory 13 performing the electric power leveling.

FIG. 18 shows a configuration of the virtual factory 13 capable of electric power (or power usage) leveling. FIG. 18 differs from FIG. 12 in that the apparatus's electric power or power usage information and the electric power or power usage condition are added as input data. FIGS. 19 and 20 provide example data representing profiles and conditions of the electric power or power usage for apparatuses. This embodiment exemplifies power restrictions. The fourth embodiment exemplifies power usage restrictions in detail.

The following describes a production system according to this embodiment with reference to FIGS. 21, 22A to 22F, 23, 24A and 24B. FIGS. 22A to 22C describe a production system without power optimization (power leveling). FIGS. 22D to 22F describe a production system with power optimization.

Designing a clean room needs to estimate a rated value of electric power used for each production apparatus. FIG. 21 shows estimated power values in the production system. FIG. 21 diagrams changes of the power and the temperature in an oxidation furnace. Based on this FIG. 21, the maximum power value is determined. The rated value of the power is found by adding a specified value to this maximum value. For example, the rated value of the power is set at 60 kw.

The thus found rated value of the production apparatus power is computed for all production apparatuses in the clean room. A preset value for the entire power is estimated by adding these rated values. There is designed the production equipment such as wiring and piping appropriate for the preset value for the entire electric power.

When a clean room uses a diffusion furnace and an RTA (Rapid Thermal Annealing) apparatus, an electric characteristic as shown in FIG. 21 is found for each apparatus. FIG. 22A shows an electric characteristic for the diffusion furnace. FIG. 22B shows an electric characteristic for the RTA apparatus. Based on these electric characteristics, the total power value is computed. FIG. 22C shows a computed power characteristic. As shown in FIG. 22C, the diffusion furnace and the RTA apparatus cause power peaks overlapping with each other, increasing a total value for the power peak.

Considering an allowance, the rated value for each production apparatus becomes several times to dozens of times as large as a value used for actual operations. Not all production apparatuses are in full production. The total power value (preset value) found for the production apparatuses tends to be greater than a value during production line operations. If the preset power value is too larger than the actual value, the production equipment such as wiring and piping is provided excessively. This causes a problem of too expensive a construction cost for the clean room.

By contrast, the start time for an RTA process using the RTA apparatus is delayed 20 minutes (ΔT) relative to the start time for the diffusion furnace. Namely, a power characteristic in FIG. 22D overlaps with that in FIG. 22E. Accordingly, as shown in FIG. 22F, a peak corresponding to total power values for two apparatuses becomes smaller than that in FIG. 22c.

Figure 23:
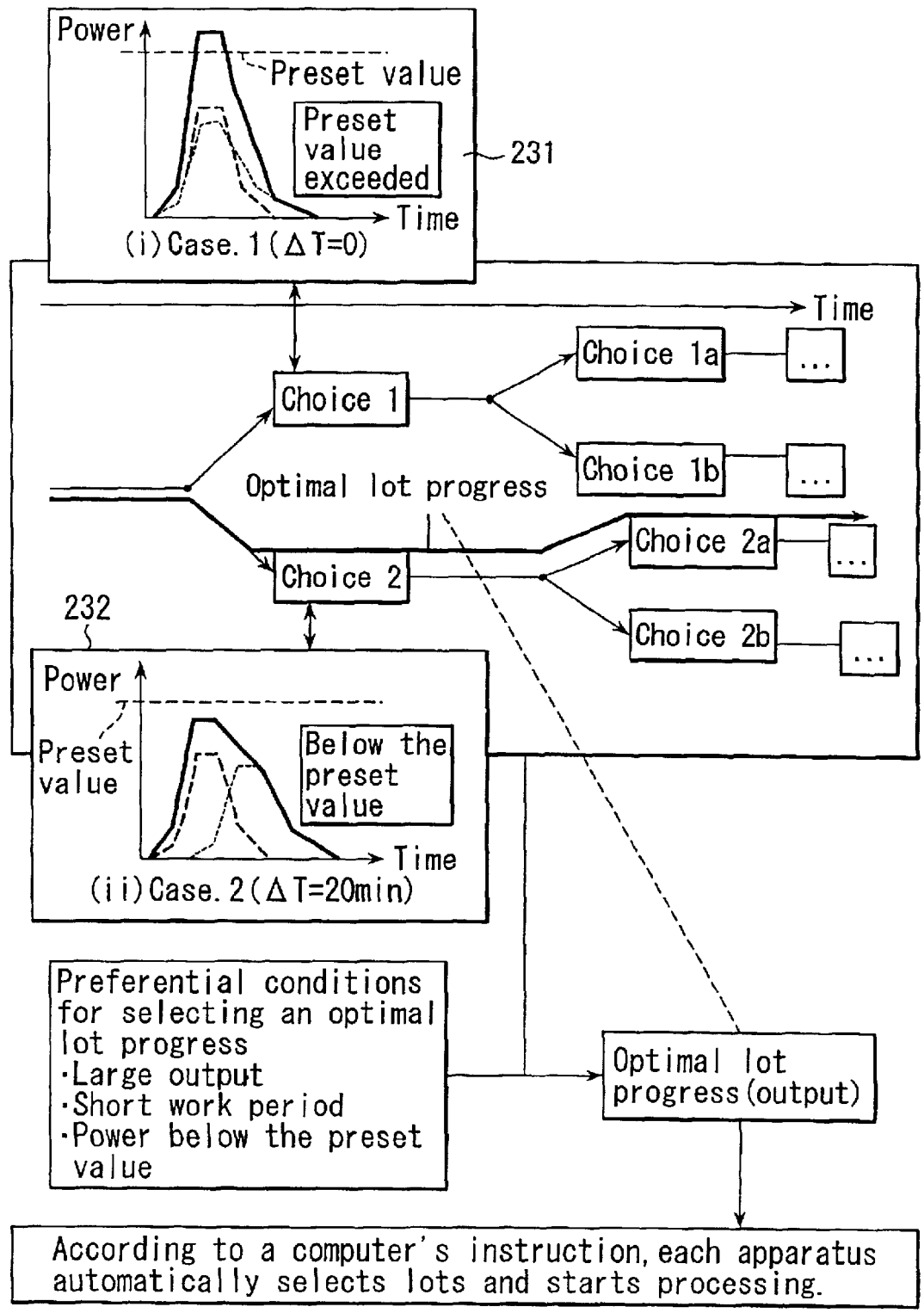
FIG. 23 describes a third embodiment, showing a procedure for selecting an optimal combination from a plurality of combinations of choices available when a lot is in process.

The production system according to this embodiment optimizes the power and flows lots so that the preset value for the entire power is not exceeded. Specifically, as shown in FIG. 23, a lot in the clean room is computed in a look-ahead manner. It is assumed that, say, the diffusion furnace and the RTA (Rapid Thermal Annealing) apparatus are found to be used concurrently according to look-ahead reading of the lot. In this case, it is assumed that the concurrent use of both the apparatuses is expected to exceed the preset power value. As seen from a reference numeral 231 in FIG. 23, the maximum power value exceeds the preset value. Here, the look-ahead computation is performed to delay the start time for an RTA process using the RTA apparatus 20 minutes (ΔT) relative to the start time for the diffusion furnace. In this case, as seen from a reference numeral 232 in FIG. 23, it is found that the maximum power value does not exceed the preset value.

A reference numeral 232 in FIG. 23 shows relationship between the time and the power when choices 2 and 2a are selected. As seen from a characteristic curve 232 in FIG. 23, it is understood that the maximum power value is maintained below the preset value. The present invention selects choices 2 and 2a from two possibilities. Namely, this type of choices provides lot flowing by shifting power peaks for two apparatuses to level the power.

This enables the production to keep the power below the preset value. In case of FIG. 22C without power optimization, the preset power value needs to be increased when the production is conducted by preventing the power from exceeding the preset value. By contrast, the case in FIG. 22F can decrease the preset power value by means of the optimization. This embodiment can derive conditions not exceeding the preset power value by keeping the preset value low.

An actual production apparatus can be provided with a port where a plurality of lots can wait. A computer can perform a look-ahead operation to compare processes for each lot. The computer can determine a sequence of processes, load lots from the port to the production apparatus, and start processing. A production apparatus operator just supplies lots to the port, saving human resources. Alternatively, it may be preferable to provide full automation by using an automatic transport system.

This production system works as a very effective technique for processing waiting lots especially after completion of the apparatus maintenance. Obviously, the production system is available before completion of the maintenance.

Alternatively, it may be preferable to allow an operator to manually transport a lot, mount it on an apparatus, start processing, and the like according to a work instruction based on the computer's look-ahead operation.

Figure 24A:
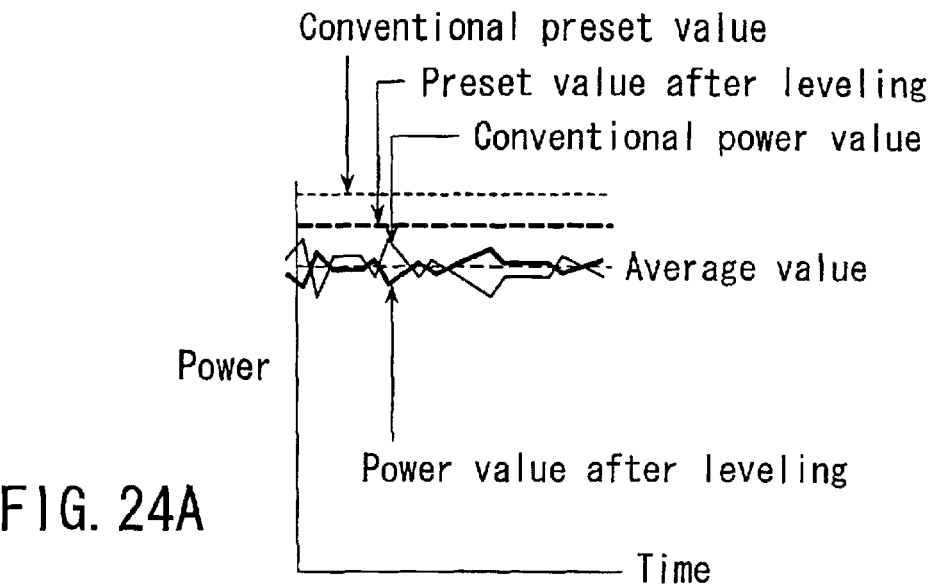
FIGS. 24A and 24B show electric power values for large-scale and small-scale production lines.
Figure 24B:
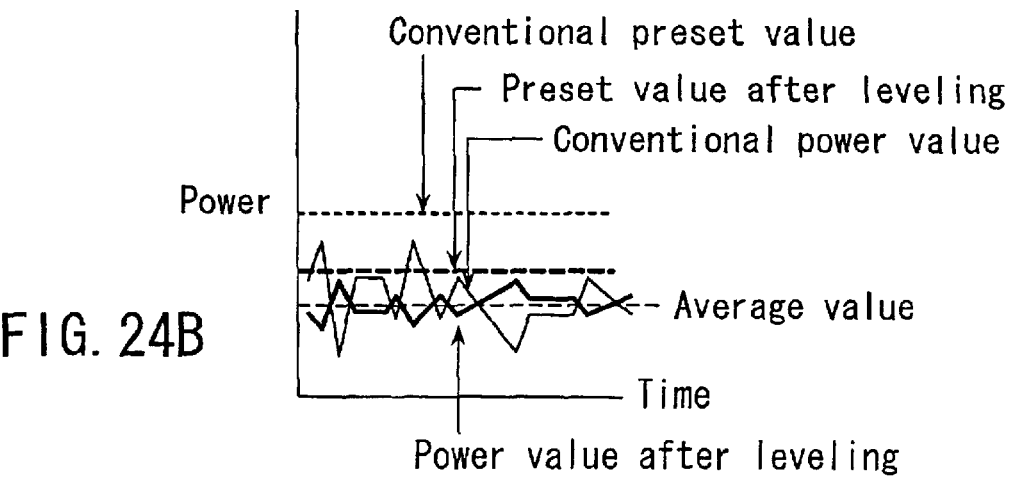

This production system can be used for large-scale and small-scale production lines, but is particularly effective for small-scale ones. FIG. 24A shows electric power values for a large-scale production line. FIG. 24B shows electric power values for a small-scale production line. A thin line indicates an electric power value before leveling (prior art). A thick line indicates an electric power value after leveling (present invention). A dotted thin line indicates a conventional preset power value. A dotted thick line indicates a preset power value after leveling. By comparing FIGS. 24A and 24B, it is understood that a difference between the leveled power value and the power value before the leveling is greater for the small-scale production line than for the large-scale production line. Namely, the small-scale production line provides a greater leveling effect than the large-scale production line. This will cause a difference between the preset power value before the leveling and the preset power value after the leveling. Namely, the small-scale production line provides a larger difference between the preset power value before the leveling and the preset power value after the leveling than the large-sale production line. This means that the small-scale production line can greatly decrease the preset power value by means of the leveling.

Thus, it is possible to suppress construction costs for the production equipment by processing lots so that the power does not exceed the preset value and by using a small preset power value.

The above-mentioned production system provides an example of adjusting two apparatuses. This production system is also applicable when three or more apparatuses are used or when there are restrictions on the power for the entire line.

There is an advantage of applying this embodiment to a given apparatus group in a line as described below concretely. Under the power conditions in FIG. 20, the power for the entire line is limited to, say, 500 kw. Further, the power is limited to 150 kw or less for an apparatus group defined as group 1 corresponding to a lithography process. Applying a limitation to each group can decrease a scale of wiring from a main power supply in the production line to the corresponding apparatus group, allowing the line construction with low costs.

Figure 25:
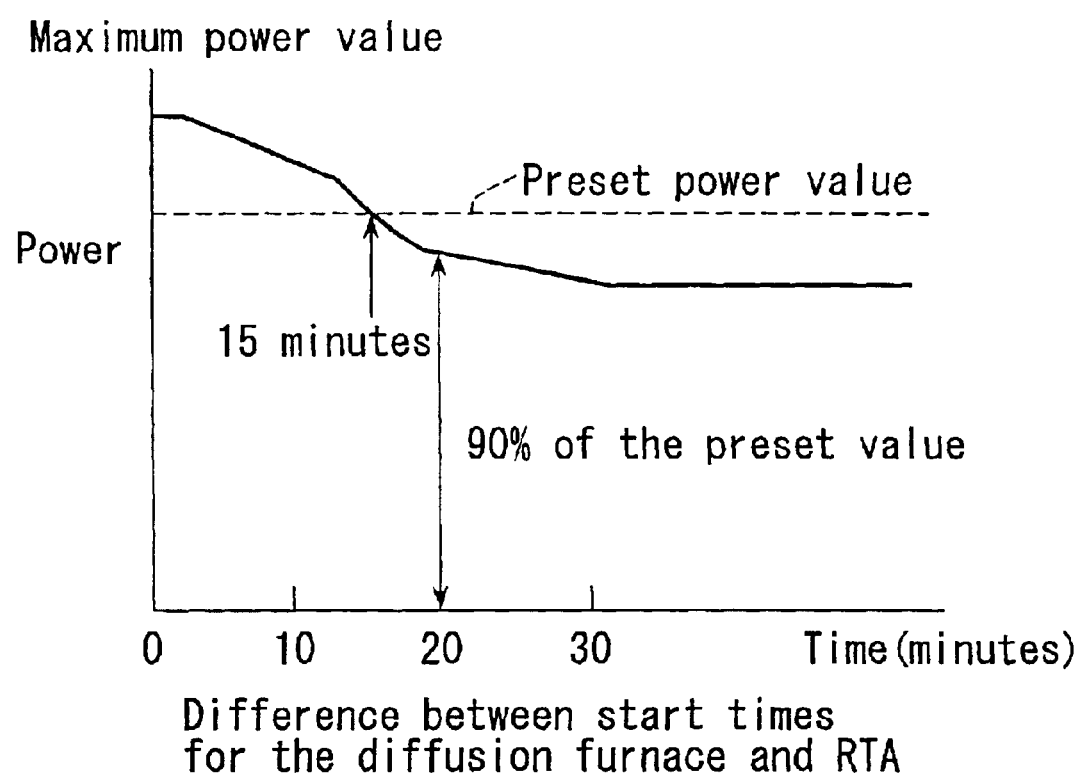
FIG. 25 shows the concept of time shift according to the third embodiment.

The above-mentioned example specifies 20 minutes as a time to shift the processing. For example, the following method can determine this time shift. FIG. 25 shows how to find a shift amount for the start time. As the start time is shifted, the maximum power value equals the preset value after 15 minutes. The maximum power value becomes 90% of the preset value after 20 minutes. When the start time is shifted 15 minutes or more, the maximum power value does not exceed the preset value. If the shift amount is set to 15 or 16 minutes, an unexpected slight fluctuation in the power may exceed the preset value, causing a power failure. This may stop the line and cause a lockout condition or a serious damage. As a solution, this example sets the shift time to 20 minutes so that the maximum value becomes 90% or less of the preset value. Apparently, this value is not limited to 90%. When a power fluctuation is large, the value can be 90% or less and the shift time can be longer than 20 minutes. On the contrary, when a power fluctuation is small, the value can be 90% or more and the shift time can be shorter than 20 minutes.

The present invention is not limited to the above-mentioned embodiment. In the above-mentioned example, the electric power leveling is described. The equivalent leveling is available for the power usage such as water (deionized water or cooling water), nitrogen gas, special material gas, and the like. The detail is described in the next embodiment.

Fourth Embodiment

This embodiment concerns a modification of the second embodiment.

The second embodiment described the cases for finding optimal processes according to purposes of processing a high-priority lot in a short work period and preferentially processing a lot subject to no or little effect of the maintenance. The fourth embodiment finds an optimal process for achieving an object to perform processing so that the power usage does not exceed a preset value.

Figure 26:
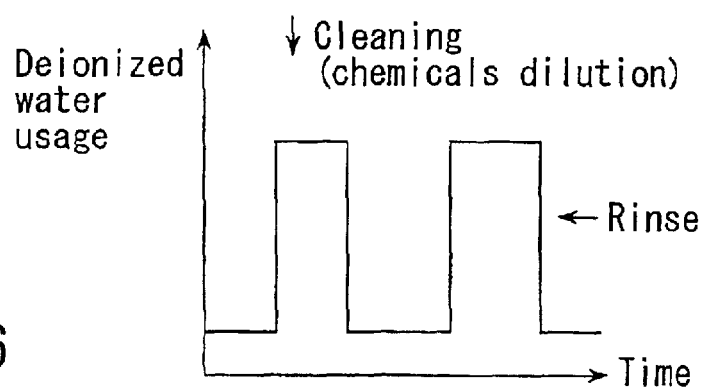
FIG. 26 describes a production system according to a fourth embodiment.
Figure 27A:
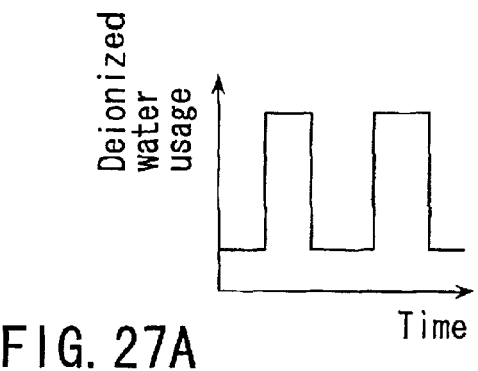
FIGS. 27A to 27C describe a production system without power optimization.
Figure 27D:
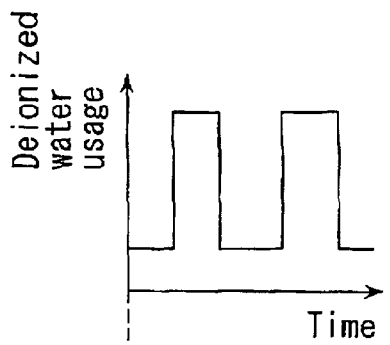
FIGS. 27D to 27F describe a production system with power optimization.
Figure 27B:
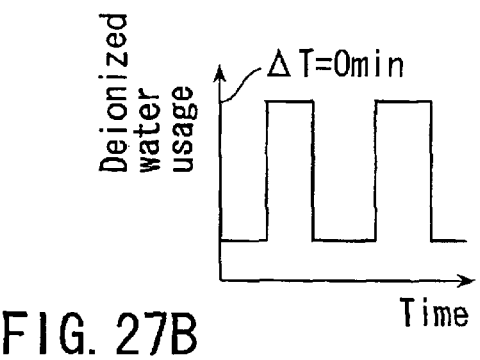
Figure 27E:
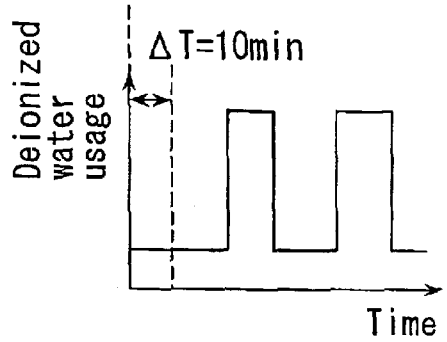
Figure 27C:
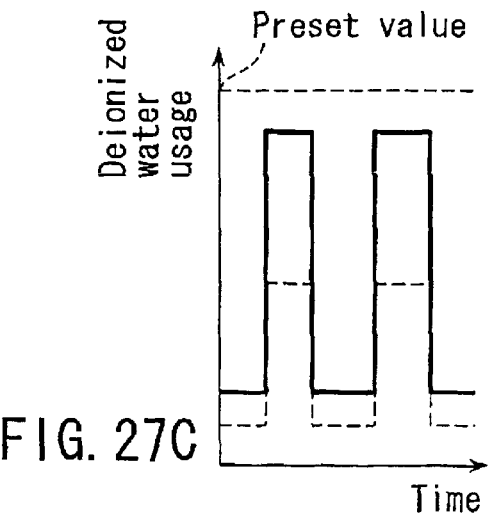
Figure 27F:
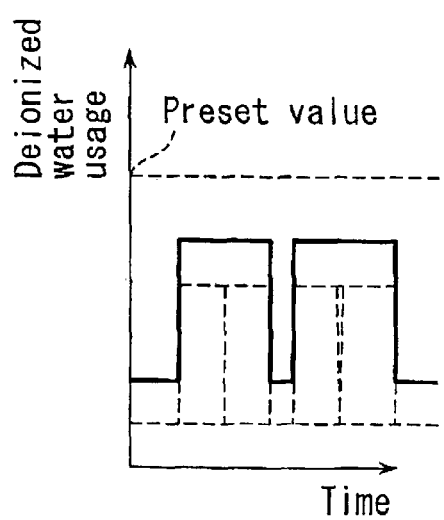

The following describes a production system according to this embodiment with reference to FIGS. 26, 27A to 27F, and 28. FIGS. 27A to 27C describe a production system without power usage optimization. FIGS. 27D to 27F describe a production system with power usage optimization. As an example of the power usage, the following describes leveling of the deionized water used for cleaning as a production system process.

FIG. 26 shows a chronological change in the usage amount of deionized water for a given treating apparatus. In the chronological change characteristic of this figure, the first peak corresponds to a diluting process for adjusting the chemicals density. The second peak occurring later than the fist peak corresponds to a rinse process.

In case a pre-treatment apparatus and a post-treatment apparatus are installed in a clean room, there is found a chronological change characteristic for the deionized water usage with respect to each apparatus as shown in FIG. 26. FIG. 27A shows the chronological change characteristic for the pre-treatment apparatus. FIG. 27B shows the chronological change characteristic for the post-treatment apparatus. These chronological change characteristics are used for computing the total usage amount. FIG. 27C shows a chronological change characteristic for the computed total value. As shown in this figure, a peak in the deionized water usage for the pre-treatment apparatus overlaps with that for the post-treatment apparatus, increasing a peak in the total deionized water usage. Accordingly, it is necessary to increase a preset value for the deionized water usage.

The start time for the post-treatment step using the post-treatment apparatus is delayed 10 minutes ($\Delta T$) relative to the start time for the pre-treatment apparatus. Namely, a characteristic in FIG. 27D is overlapped with a characteristic in FIG. 27E. As shown in FIG. 27F, a peak in the total value for two deionized water usage amounts becomes smaller than that shown in FIG. 27C.

Figure 28:
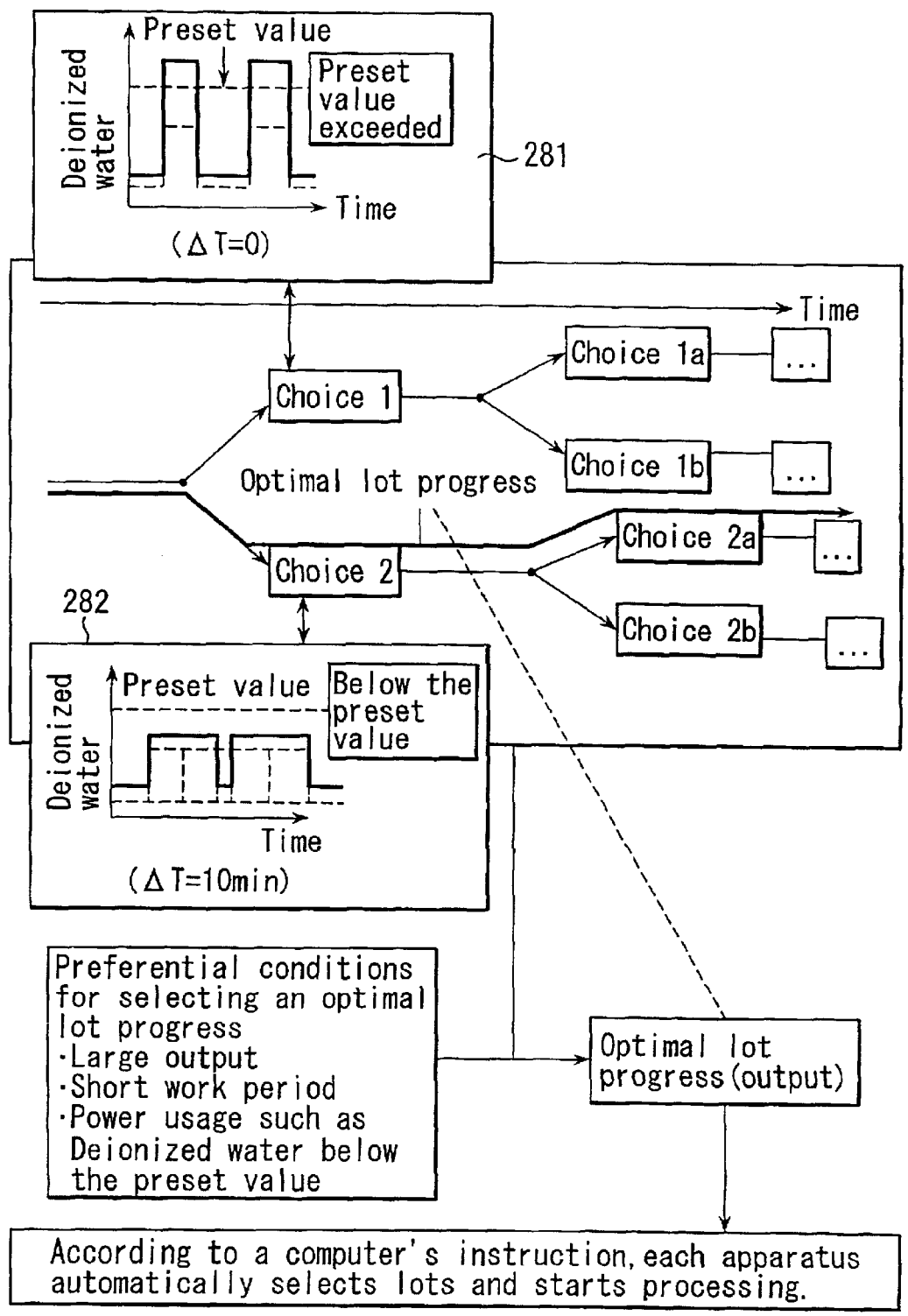
FIG. 28 describes a fourth embodiment, showing a procedure for selecting an optimal combination from a plurality of combinations of choices available when a lot is in process.

The production system for optimizing the power usage flows lots so that the maximum value does not exceed the preset value for the entire power usage. Specifically, look-ahead computation is performed for a lot in the clean room as shown in FIG. 28. During the lot look-ahead, for example, it is found that the pre-treatment apparatus and the post-treatment apparatus are used concurrently. In this case, the maximum value is expected to exceed the preset power usage value if both the apparatuses are used concurrently. A reference numeral 281 in FIG. 28 shows that the maximum value for the deionized water usage exceeds the preset value. Then, the look-ahead computation is used to delay the start time of the post-treatment using the post-treatment apparatus by 10 minutes relative to the start time of the pre-treatment apparatus. Consequently, as indicated by a reference numeral 282 of FIG. 28, it is found that the maximum value of the deionized water usage does not exceed the preset value.

In FIG. 28, a reference numeral 282 shows relationship between the time and the deionized water usage when choices 2 and 2*a* are selected. The characteristic curve indicated by the reference numeral 282 shows that the maximum value of the deionized water usage is kept under the preset value. The present invention selects choices 2 and 2*a* from two possibilities. Namely, this type of choices provides lot flowing by shifting power peaks for two apparatuses to level the power usage.

A technique similar to that described in the third embodiment (FIG. 25) can be used to find an interval (10 minutes in this example) for delaying the start time for a post-treatment step by the post-treatment apparatus relative to the start time for the pre-treatment apparatus.

The use of the above-mentioned technique enables the production which does not exceed the preset value for the power usage. In case of FIG. 27C without power optimization, the preset power usage value needs to be increased when the production is conducted by preventing the power usage from exceeding the preset value. By contrast, the case in FIG. 27F can decrease the preset power usage value by means of the optimization (leveling). This embodiment can derive conditions not exceeding the preset power usage value by keeping the preset value low.

The present invention is not limited to the above-mentioned embodiment. In the above-mentioned example, the deionized water is described. The equivalent leveling is available for the other power usage such as cooling water, nitrogen gas, special material gas, and the like. Consequently, it is possible to downsize the production equipment scale and suppress manufacturing costs for a clean room. Further, the similar leveling is also available for the duct exhaust such as thermal exhaust and cabinet exhaust. Leveling such an exhaust amount can decrease the exhaust piping size and suppress the power for an air blower or local exhaust.

Especially, it can miniaturize the piping size which is used for deionized water, a cooling water, and gas. In case the piping size is such small that it can be bent by implements and the like, it is unnecessary to weld or glue by using jointers. Therefore, the embodiment has an advantage that workers can install piping easily, thereby to shorten construction term of the clean room, putting term of the equipment in and out, changing term of the layout of each equipment.

Apparently, it is possible to combine the third and the fourth embodiments to provide a small preset value for both the electric power and the power usage. The equipment scale can be further decreased by flowing lots so that the preset value is not exceeded.

The third and the fourth embodiments explain the system which manages an optimal lot progress based on the preset value for the electric power or the power usage. This system can be also used for designing the production equipment. Specifically, according to the method of decreasing a peak of the electric power or the power usage as shown in FIGS. 22A to 22F and 27A to 27F, the system computes a preset value of the decreased electric power or the decreased power usage for apparatuses. The production equipment is designed based on the computed preset value. This makes it possible to design streamlined small-scale production equipment. Further, the present invention includes a method of constructing the production equipment based on this design technique for the production equipment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A production equipment management system, comprising:
    a virtual production line providing a computer with substantially the same functions as for a real production line which actually manufactures products and comprises a plurality of manufacturing devices;
    transferring means configured to transfer various information including information of operation of each of said plurality of manufacturing devices about said real production line to said virtual production line;
    computing means configured to compute at least one time dependency of electric power and power usage based on said transferred information, with respect to each of a plurality of operating conditions in which operation timing of said each of said plurality of manufacturing devices is shifted from each other;
    determining means configured to determine set at least one of an electric power value and a power usage value used for a production line based on the time dependency as regards said each of said plurality of operating conditions obtained by said means for computing the time dependency; and
    managing means configured to maintain at least one of said determined electric power value and power usage value in design of a production equipment.

2. The production equipment management system according to claim 1, wherein:
    said production equipment is at least one of production line wiring and production line piping.

3. A production equipment management method of managing production equipment by performing simulation in a virtual production line so constructed as to provide a computer with substantially the same functions as for a real production line which actually manufactures products and comprises a plurality of manufacturing devices, said method comprising:
    receiving various information including information of operation of each of said plurality of manufacturing devices about said real production line by means of said virtual production line;
    computing at least one time dependency of electric power and power usage, with respect to each of a plurality of operating conditions in which operation timing of said each of said plurality of manufacturing devices is shifted from each other, based on said received information;
    setting at least one of an electric power value and a power usage value used for a production line based on the time dependency obtained by said means for computing the time dependency as regards said each of said plurality of operating conditions; and
    managing production equipment based on at least one of said determined electric power value and power usage value.

4. A production equipment management method of performing simulation in a virtual production line so constructed as to provide a computer with substantially the same functions as for a real production line which actually manufactures products and comprises a plurality of manufacturing devices, and managing production equipment based on this simulation result, said method comprising:
    receiving various information including information of operation of each of said plurality of manufacturing devices about said real production line by means of said virtual production line;
    computing at least one time dependency of electric power and power usage, with respect to each of a plurality of operating conditions in which operation timing of said each of said plurality of manufacturing devices is shifted from each other, based on said received information;
    setting at least one of an electric power value and a power usage value used for a production line based on the time dependency obtained by said means for computing the time dependency as regards said each of said plurality of operating conditions; and
    manufacturing production equipment so that at least one of said determined electric power value and power usage value is satisfied.

* * * * *